United States Patent
Tobita et al.

(10) Patent No.: US 6,734,855 B2
(45) Date of Patent: May 11, 2004

(54) IMAGE EDITING SYSTEM AND METHOD, IMAGE PROCESSING SYSTEM AND METHOD, AND RECORDING MEDIA THEREFOR

(75) Inventors: Hiroaki Tobita, Tokyo (JP); Hidenori Karasawa, Tokyo (JP); Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 09/901,733

(22) Filed: Jul. 10, 2001

(65) Prior Publication Data

US 2002/0018065 A1 Feb. 14, 2002

(30) Foreign Application Priority Data

Jul. 11, 2000 (JP) .................................... 2000-209731
Sep. 7, 2000 (JP) .................................... 2000-271354

(51) Int. Cl.$^7$ .............................................. G06T 15/20
(52) U.S. Cl. ..................................... 345/427; 345/689
(58) Field of Search ................................ 345/419, 427, 345/689

(56) References Cited

U.S. PATENT DOCUMENTS 5,422,989 A * 6/1995 Bell et al. .................... 345/589
6,226,000 B1 * 5/2001 Richens et al. ............. 345/419

OTHER PUBLICATIONS

DesignWorkshop User Guide, Artifice, Inc. 1998, sections 2.1, 2.6, 3.1.2, 3.1.7, 3.3.1, 3.3.2, 3.3.4, 4.1, 5.1.1.*

* cited by examiner

*Primary Examiner*—Mark Zimmerman
*Assistant Examiner*—Lance W. Sealey
(74) *Attorney, Agent, or Firm*—Frommer Lawrence & Haug LLP; William S. Frommer

(57) ABSTRACT

Three-dimensional image processing has two processes. In a first process, a three-dimensional space including only a horizon appears on a display screen. By drawing a stroke line in the space, a wall having the stroke line as the base line is set as a canvas. A picture drawn by a user is mapped onto the canvas, resulting in a three-dimensional picture. By repeatedly setting the canvases and pictures, a desired scene can be constructed. A desired three-dimensional scene can further be obtained by rotating the canvas or moving the viewing point. In a second process, the base line of the canvas is constantly displaced between a first curve, a second curve, and an interpolation curve. The three-dimensional image pasted on the canvas is moved in accordance with the movement of the canvas. Thus, it appears to the user that the three-dimensional image is animating.

19 Claims, 27 Drawing Sheets

| FILE | EDIT | VIEW | SCENE OPTION | END |

OPERATIONS ARE CANCELED ACCORDING TO THE NUMBER OF CLICKS

⑦ CANVAS IS ERASED

① A WALL IS SET AND
A PICTURE IS DRAWN
ON THE WALL

②A WALL IS SET AND
A PICTURE IS DRAWN
ON THE WALL

③A WALL IS SET AND A PICTURE IS DRAWN ON THE WALL

⑥ BY USING THE "TOP VIEW" DIALOG, THE VIEWING POINT IS RETURNED TO THE ORIGINAL POSITION

IMAGE EDITING SYSTEM AND METHOD, IMAGE PROCESSING SYSTEM AND METHOD, AND RECORDING MEDIA THEREFOR

BACKGROUND OF THE INVENTION

1. Field of the Invention

The present invention relates to an image editing system and method for creating and editing three-dimensional images on a computer system, and more particularly, to an image editing system and method for creating and editing three-dimensional images on a computer system from two-dimensional input images. More specifically, the invention pertains to an image editing system and method for creating and editing three-dimensional images on a computer system from hand-drawn images input through a device, such as a mouse, and more particularly to an image editing system and method for creating and editing three-dimensional images from hand-drawn images drawn on a virtual canvas. The invention also relates to an image processing system and method for processing three-dimensional images on a computer system. More particularly, the invention pertains to an image processing system and method for creating and editing three-dimensional images on a computer system from hand-drawn images input through a coordinate designation device, such as a mouse, or from two-dimensional images read from a local disk. More specifically, the invention relates to an image processing system and method for creating and editing three-dimensional images from hand-drawn images drawn on a virtual canvas or two-dimensional images read from a local disk, and more particularly to an image processing system and method for providing motion to three-dimensional images created and edited on a three-dimensional canvas.

2. Description of the Related Art

Along with recent progress in semiconductor technologies and information technologies, inexpensive and high-powered computer systems, which are referred to as "personal computers (PCs)" or "work stations (WSs)", are coming into wide use. In these computer systems, various applications can be run in an execution environment provided by an operating system (OS).

There are many types of applications used on a computer system, such as word processing, spreadsheets, databases, communications, and graphics. For example, on a computer system provided with a high-power computation or rendering function, realistic-looking graphics, such as two-dimensional or three-dimensional graphics, can easily be created, rendered, and modified.

Basically, images displayed on a display screen of a computer are two-dimensional images. However, by using a computation function of the computer, the two-dimensional images can be first converted into a three-dimensional world coordinate system and further into a viewing-point coordinate system. As a result, three-dimensional images can be automatically created. Additionally, by rotating or translating a rendered object in the three dimensional space, the object can be displayed and observed from a different point of view.

Most pictures in the real world, such as watercolor paintings or oil paintings, are created by predetermined strokes drawn with a brush on a canvas. In contrast, on a computer system, strokes are drawn on a display screen with a mouse cursor according to a "brush" function.

Simple, rough images similar to hand-drawn images can be input into a computer with a mouse. In this case, such an image is an image developed in a two-dimensional plane, and is processed as, for example, digital data, which is a set of dots or lines, by the computer system. However, such manually input digital data cannot be modified into a high level image on a computer system. In other words, a technique for processing two-dimensional hand-drawn images as three-dimensional images is not known.

SUMMARY OF THE INVENTION

Accordingly, it is an object of the present invention to provide an image editing system and method for creating and editing three-dimensional images on a computer system from two-dimensional input images.

It is another object of the present invention to provide an image editing system and method for creating and editing three-dimensional images on a computer system from hand-drawn images input through a device, such as a mouse.

It is still another object of the present invention to provide an image editing system and method for creating and editing three-dimensional images from hand-drawn images drawn on a virtual canvas.

It is a further object of the present invention to provide an image processing system and method for creating and editing three-dimensional images on a computer system from hand-drawn images input through a device, such as a mouse, or two-dimensional images read from a local disk.

It is a yet further object of the present invention to provide an image processing system and method for creating and editing three-dimensional images from hand-drawn images drawn on a virtual canvas or two-dimensional images read from a local disk.

It is a further object of the present invention to provide an image processing system and method for providing motion to three-dimensional images created and edited on a three-dimensional canvas.

In order to achieve the above objects, according to one aspect of the present invention, there is provided an image editing system for creating and editing a three-dimensional image. The image editing system includes a canvas setting unit for setting a canvas in a three-dimensional space. An image input unit inputs an image into the set canvas and pastes the image onto the canvas. An image modifying unit modifies the input image according to an operation performed on the canvas by a user.

According to another aspect of the present invention, there is provided an image editing method for creating and editing a three-dimensional image. The image editing method includes: a canvas setting step of setting a canvas in a three-dimensional space; an image input step of inputting an image into the set canvas and pasting the image onto the canvas; and an image modifying step of modifying the input image in accordance with an operation performed on the canvas by a user.

In the aforementioned image editing system or method, the canvas setting unit or step may set as the canvas a wall whose base line is formed by a stroke line which is drawn by dragging a mouse by the user in the three-dimensional space including only a horizon.

The image input unit or step may input as the image a stroke line drawn by dragging a mouse on the set canvas by the user, and may paste the stroke line onto the canvas.

The image input unit or step may read an image file stored in a predetermined storage device, and may paste the image onto the set canvas.

The image modifying unit or step may rotate or translate the image pasted on the canvas in accordance with a rotation operation or a translation operation performed on the canvas.

The canvas setting unit or step may set a plurality of canvases in a single three-dimensional space, and the image input unit or step may input an image into each of the set canvases.

The image input unit or step may input the image not only into the canvas, but also into a ground.

When a new canvas is drawn, the canvas setting unit/step may not display a canvas which has already been drawn except a base line of the canvas.

According to still another aspect of the present invention, there is provided a storage medium for physically storing computer-readable software which allows a computer system to execute image editing processing for creating and editing a three-dimensional image. The computer-readable software includes: a canvas setting step of setting a canvas in a three-dimensional space; an image input step of inputting an image into the set canvas and pasting the image onto the canvas; and an image modifying step of modifying the input image in accordance with an operation performed on the canvas by a user.

With this arrangement, three-dimensional images can be created and edited on a computer system from two-dimensional input images. Three-dimensional images can also be created and edited on a computer system from hand-drawn images input through a device, such as a mouse. Additionally, three-dimensional images can be created and edited on a computer system from hand-drawn images drawn on a virtual canvas.

According to the above-described aspects of the present invention, a three-dimensional scene can be constructed as if the user draws a sketch in a two-dimensional plane. Additionally, an image is projected on a three-dimensional canvas, thereby obviating the need for the operator to operate a user input device in a three-dimensional space. It is also possible to simultaneously perform three-dimensional modeling and scene construction. The user is also able to browse the constructed scenes in different viewing directions.

According to a further aspect of the present invention, there is provided an image processing system for processing a three-dimensional image. The image processing system includes an image input unit for inputting a two-dimensional image. A first-curve setting unit sets a first curve, which serves as a base line of a canvas, in a three-dimensional space. A second-curve setting unit sets a second curve, which is different from the first curve, in the three-dimensional space. An interpolation-curve generating unit generates at least one interpolation curve for interpolating the first curve and the second curve. An image generating unit creates the three-dimensional image by pasting the image input by the image input unit onto the canvas whose base line is one of the first curve, the second curve, and the interpolation curve.

The term "system" means a logical group of a plurality of devices (or a plurality of functional modules implementing specific functions), and it is not essential that each device or functional module be in a single casing.

According to a yet further aspect of the present invention, there is provided an image processing method for processing a three-dimensional image. The image processing method includes: an image input step of inputting a two-dimensional image; a first-curve setting step of setting a first curve, which serves as a base line of a canvas, in a three-dimensional space; a second-curve setting step of setting a second curve, which is different from the first curve, in the three-dimensional space; an interpolation-curve generating step of generating at least one interpolation curve for interpolating the first curve and the second curve; and an image generating step of creating the three-dimensional image by pasting the image input in the image input step onto the canvas whose base line is one of the first curve, the second curve, and the interpolation curve.

According to the aforementioned image processing system or method, a plurality of interpolation curves for interpolating the first curve and the second curve, which each forms the base line of the canvas, are automatically generated. The base line of the canvas is then constantly moved from the first curve to the second curve via the interpolation curves and from the second curve to the first curve via the interpolation curves.

As a result, a three-dimensional image pasted on the canvas is constantly moving or transforming according to the movement of the canvas. Thus, it appears to the user that the three-dimensional image is animating.

In the above-described image processing system or method, at least one of the first-curve setting unit or step and the second-curve setting unit or step may set as the first or second curve a stroke line drawn by dragging a mouse by a user in the three-dimensional space including only a horizon.

The image generating unit or step may constantly move the base line of the canvas to which the input image is to be pasted between the first curve, the second curve, and the interpolation curve.

The image input unit or step may input as the image a stroke line drawn by dragging a mouse onto the canvas by a user, or may input the two-dimensional image from an image file read from a predetermined storage device.

According to a further aspect of the present invention, there is provided an image processing system for processing a three-dimensional image. The image processing system includes an image input unit for inputting a two-dimensional image. A first-curve setting unit sets a first curve, which serves as a base line of a canvas, in a three-dimensional space. An interpolation-curve generating unit generates at least one interpolation curve based on the first curve. An image generating unit creates the three-dimensional image by pasting the image input by the image input unit onto the canvas whose base line is one of the first curve and the interpolation curve.

According to a further aspect of the present invention, there is provided an image processing method for processing a three-dimensional image. The image processing method includes: an image input step of inputting a two-dimensional image; a first-curve setting step of setting a first curve, which serves as a base line of a canvas, in a three-dimensional space; an interpolation-curve generating step of generating at least one interpolation curve based on the first curve; and an image generating step of creating the three-dimensional image by pasting the image input in the image input step onto the canvas whose base line is one of the first curve and the interpolation curve.

In the aforementioned image processing system or method, the interpolation curve may automatically be generated based on the base line of the canvas set in the image editing step according to computation processing of a computer rather than being set by the user.

For example, the interpolation-curve generating unit or step may generate the interpolation curve by setting a plurality of control points on the first curve and by constantly displacing the control points by using random numbers.

As a result, the base line of the canvas is randomly transformed based on the first curve. A three-dimensional image pasted on the canvas is moved according to the movement of the canvas. Thus, it appears to the user that the three-dimensional image is vibrating.

By moving the three-dimensional image, a three-dimensional sketch becomes realistic-looking. According to this technique, opening and shutting a door or fluttering of a flag can be expressed.

According to the above-described image processing system or method, an excessive burden is not imposed on the user, i.e., the creator of the three-dimensional image. That is, the user simply creates one picture, and then, a plurality of canvases for pasting the picture can automatically be created by the system. It is thus possible to easily construct an animated three-dimensional world.

According to a further aspect of the present invention, there is provided a storage medium for physically storing computer-readable software which allows a computer system to execute three-dimensional image processing. The computer-readable software includes: an image input step of inputting a two-dimensional image; a first-curve setting step of setting a first curve, which serves as a base line of a canvas, in a three-dimensional space; a second-curve setting step of setting a second curve, which is different from the first curve, in the three-dimensional space; an interpolation-curve generating step of generating at least one interpolation curve for interpolating the first curve and the second curve; and an image generating step of creating the three-dimensional image by pasting the image input in the image input step onto the canvas whose base line is one of the first curve, the second curve, and the interpolation curve.

According to a further aspect of the present invention, there is provided a storage medium for physically storing computer-readable software which allows a computer system to execute three-dimensional image processing. The computer-readable software includes: an image input step of inputting a two-dimensional image; a first-curve setting step of setting a first curve, which serves as a base line of a canvas, in a three-dimensional space; an interpolation-curve generating step of generating at least one interpolation curve based on the first curve; and an image generating step of creating the three-dimensional image by pasting the image input in the image input step onto the canvas whose base line is one of the first curve and the interpolation curve as the base line.

The above-described recording media of the present invention are media for physically providing computer-readable software to a general-purpose computer system which is able to execute various program codes. Such media are portable, detachable recording media, such as compact disks (CDs), floppy disks (FDs), and magneto-optical (MO) disks. It is also technically possible to provide computer-readable software to a specific computer system via a transmission line, such as a network (wireless or cable).

In such storage media, structural or functional cooperative relationships between the computer-readable software and the storage media for implementing the functions of the predetermined computer-readable software on a computer system are defined. In other words, by installing the predetermined computer-readable software into a computer system via the corresponding recording medium of the present invention, the above-described cooperative functions are exerted in the computer system. As a result, advantages similar to those exhibited by the image editing system and method or the image processing system and method can be obtained.

Further objects, features and advantages of the present invention will become apparent from the following description of the preferred embodiments with reference to the attached drawings.

DESCRIPTION OF THE PREFERRED EMBODIMENTS

The present invention is described in detail below with reference to the accompanying drawings through illustration of preferred embodiments.

Figure 1:
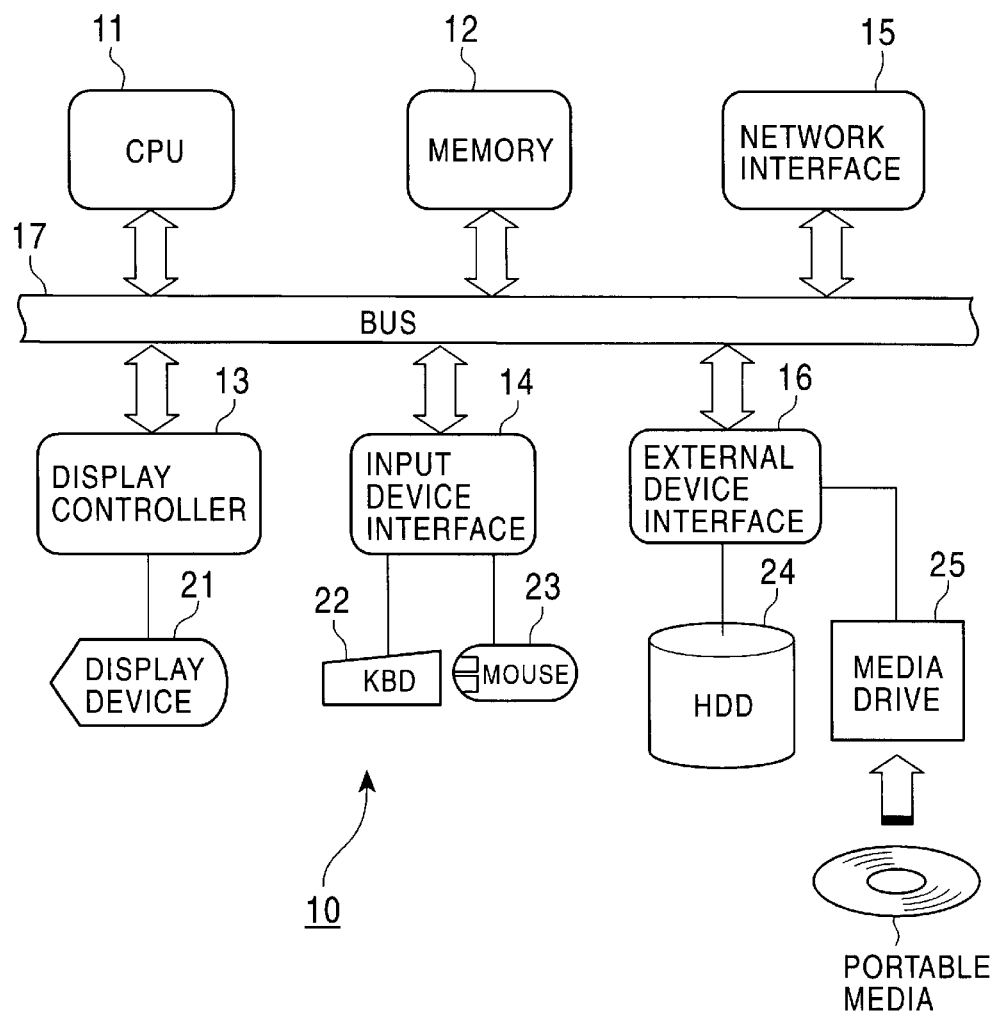
FIG. 1 is a block diagram illustrating the hardware configuration of an image editing/processing system according to the present invention.

FIG. 1 schematically illustrates the hardware configuration of an image editing system according to a first embodiment of the present invention. An image editing system 10 is implemented by running an image editing application on a general-purpose computer system, such as a WS or a PC. An example of the computer system is a PC/AT, i.e., an IBM-compatible machine, or a more recent machine. The individual elements of the image editing system 10 are discussed below.

A central processing unit (CPU) 11, which serves as a main controller of the image editing system 10, executes various applications under the control of an OS. More preferably, the OS provides a bit-map rendering function and a graphical user interface (GUI) environment. As the OS, UNIX or Windows 98/NT by Microsoft Corporation may be used.

As shown in FIG. 1, the CPU 11 is connected to other devices (described below) via a bus 17. Each device on the bus 17 is provided with a memory address or an input/output (I/O) address unique to the corresponding device, and the CPU 11 is able to access each device by specifying the corresponding address. The bus 17 is a common signal transmission line including an address bus, a data bus, and a control bus, and may be a peripheral component interconnect (PCI) bus.

A memory 12 is a storage device for storing program code executed by the CPU 11 and for temporarily storing work data while it is executed. It is to be understood that the memory 12 shown in FIG. 1 includes both a non-volatile memory and a volatile memory.

A display controller 13 is a special controller for processing rendering commands issued by the CPU 11. For example, the display controller 13 supports a bit-map rendering function corresponding to the Super Video Graphic Array (SVGA) or extended Graphic Array (XGA) standards. The rendering data processed by the display controller 13 is temporarily written into, for example, a frame buffer (not shown), and is output to a display device 21. The display device 21 may be a cathode ray tube (CRT) display or a liquid crystal display.

An input device interface 14 is used for connecting a user input device, such as a keyboard 22 or a mouse 23 to the image editing system 10. The input device interface 14 responds to a coordinate specifying instruction input through the keyboard 22 or the mouse 23, and generates an interrupt in the CPU 11.

A network interface 15 is used for connecting the image editing system 10 to a network (not shown), such as a local area network (LAN), according to a predetermined communication protocol, such as Ethernet. Generally, the network interface 15 is provided in the form of a LAN adapter card, and is inserted into a PCI bus slot on a motherboard (not shown).

A plurality of hosts (computers) are transparently connected on the LAN so that a decentralized computing environment is constructed. One of the hosts serves as a router, thereby connecting this network to another LAN or an external network, such as the Internet. On the Internet, software programs or data content can be distributed. For example, an image editing application or three-dimensional rendering data created and edited on the image editing application according to the first embodiment may be distributed via a network.

The image editing system 10 may be connected to a network via a modem or a telephone line (neither of them is shown) rather than the network interface 15.

An external device interface 16 is used for connecting an external device, such as a hard disk drive (HDD) 24 or a media drive 25, to the image editing system 10. The external device interface 16 complies with interface standards, such as integrated drive electronics (IDE) or small computer system interface (SCSI).

The HDD 24 is a known external storage device in which a magnetic disk is mounted, and has a greater storage capacity and a higher data transfer rate than other types of storage devices. Placing a software program on the HDD 24 so that it can be executable is referred to as "installing" the program into the system. Normally, the HDD 24 stores program codes of the operating system executed by the CPU 11, application programs, and device drivers in a non-volatile state. For example, the image editing application of this embodiment is installed on the HDD 24. Three-dimensional rendering data created in the image editing application can also be stored on the HDD 24 in a predetermined file format.

The media drive 25 is used for loading a portable medium, such as a CD, an MO disk, and a digital versatile disk (DVD), therein, and for accessing the data recording surface. The portable medium is primarily used for backup of software programs and data files in a computer readable format, or for transferring such programs and files among a plurality of systems (this includes sales and distribution of the programs and files). For example, the image editing application and the three-dimensional rendering data created and edited in the image editing application according to the first embodiment can be distributed by using such a portable medium.

Figure 2:
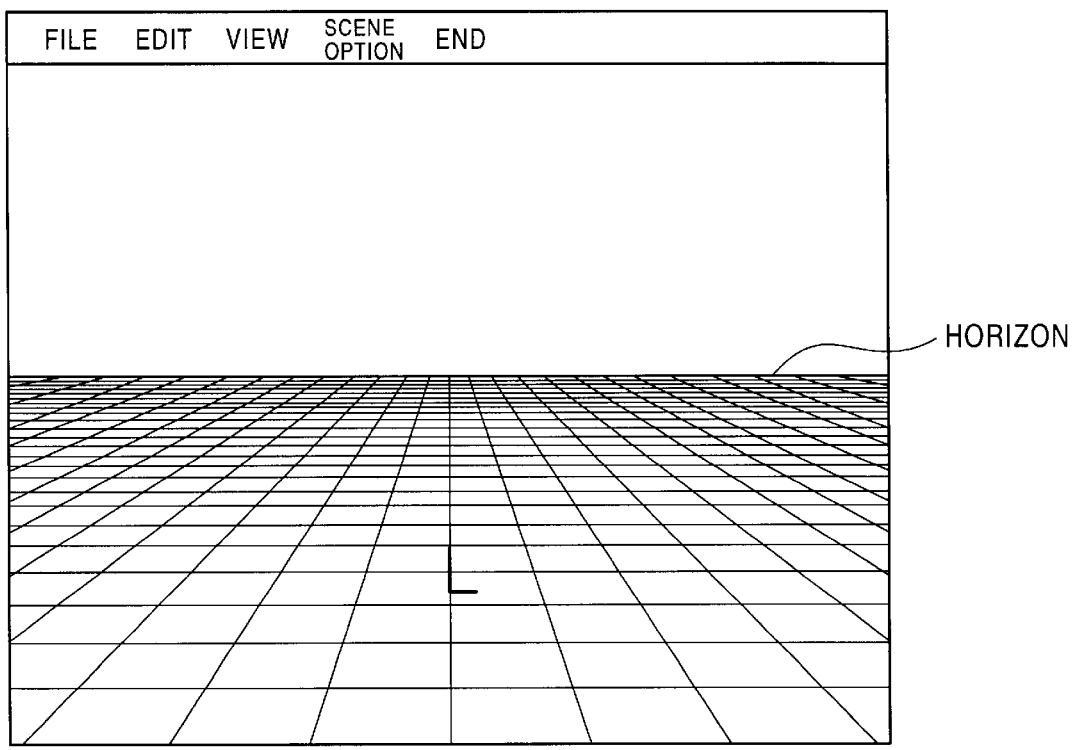
FIG. 2 illustrates an example of an initial image editing/processing screen provided by the image editing/processing system shown in FIG. 1.

The image editing operation performed by the image editing system 10 is as follows. FIG. 2 illustrates an initial image editing screen provided by the image editing system 10.

The image editing screen is displayed by using the GUI window of the display device 21. The initial window is formed of, as shown in FIG. 2, a three-dimensional space indicating only a horizon. A user is able to perform not only regular GUI operations, such as a mouse click or a drag-and-drop operation, by using a coordinate designation device, such as the mouse 23, but also an image editing operation, such as drawing lines by strokes in the three-dimensional space.

Figure 6:
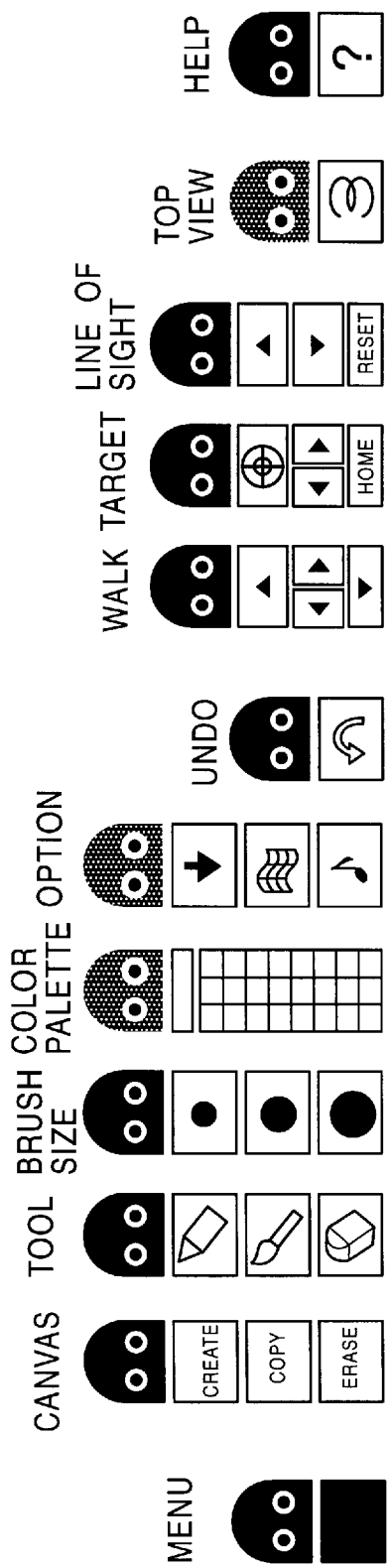
FIG. 6 illustrates menu dialogs displayed on the image editing screen.

Menu dialogs shown in FIG. 6 may appear on the image editing screen. In the example shown in FIG. 6, twelve dialogs, such as "menu", "canvas", "tool", "brush size", "color palette", "option", "undo", "walk", "target", "line of sight", "top view", and "help", are provided. Each menu is formed as a character-based icon, and can be selected by a mouse click according to a regular GUI operation.

When a menu dialog is selected with a click, one of the two events is generated: a character's head extends upward (or appears from below) and a character's expression changes.

Figure 7A:
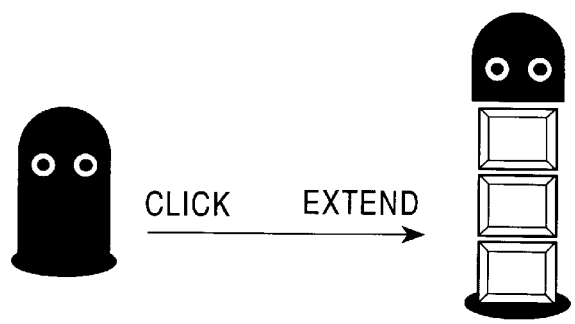
FIGS. 7A and 7B illustrate a technique for operating the menu dialogs.

In the case of a menu dialog having more detailed menus (sub-menus), a sub-menu appears by clicking the menu dialog, and a certain item can be selected from the sub-menu. However, when a menu including input/output operations of files is selected, a balloon pops up rather than a character's head extending. When a fully extended character's head is clicked, it returns to the original position (see FIG. 7A).

Figure 7B:
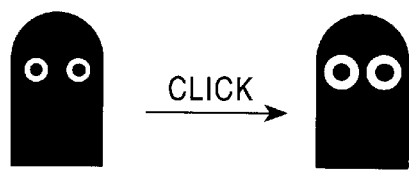

If a menu without a sub-menu is clicked, it no longer extends, thereby failing to present visual feedback. In this case, the character's expression of the menu dialog is changed, thereby informing the user that the menu has been selected, as shown in FIG. 7B.

Figure 8:
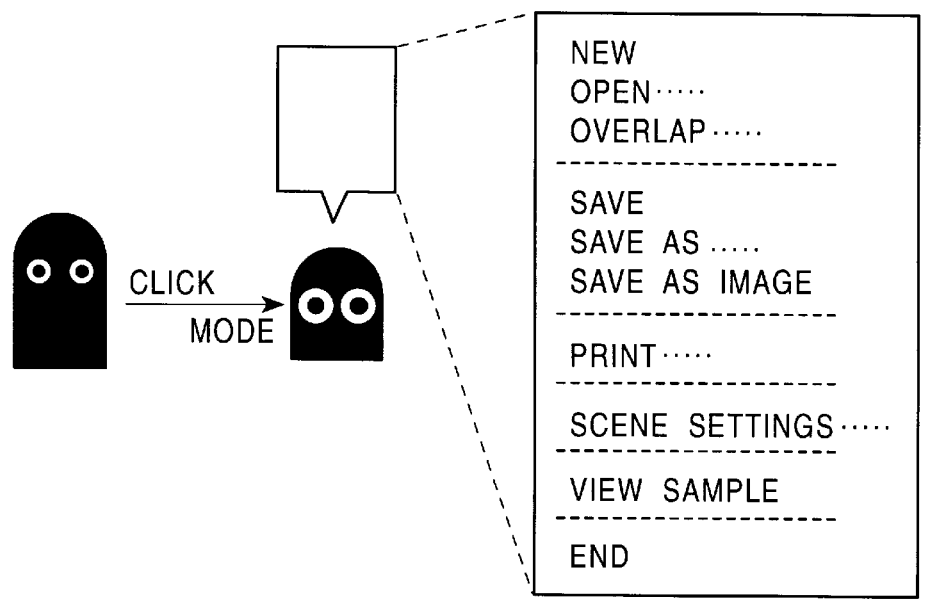
FIG. 8 illustrates a technique for operating the dialog "menu"

The dialog "menu" shown in FIG. 6 is used for selecting the input/output operation of a file, and is similar to the "file" on a menu bar. When the dialog "menu" is clicked, a sub-menu appears as a balloon. FIG. 8 illustrates the operation of the dialog "menu". In the balloon, a sub-menu including "new", "open", "overlap", "save", "save as", and so on, is provided.

Figure 9:
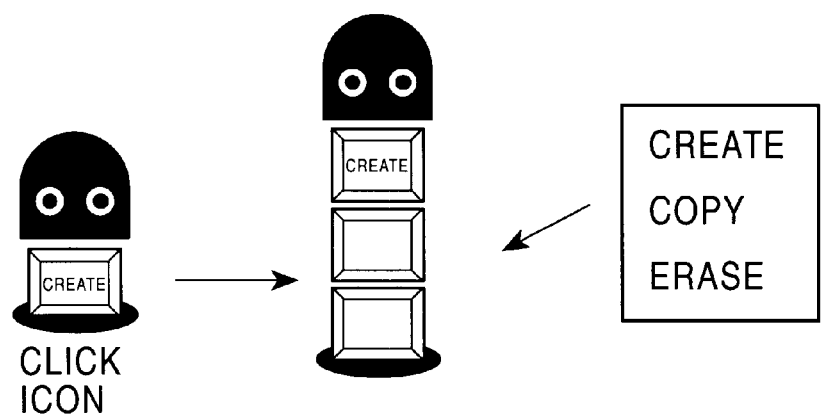
FIG. 9 illustrates a technique for operating the dialog "canvas"

The dialog "canvas" shown in FIG. 6 is used for selecting canvas-related operations. In this embodiment, three operations, such as "create", "copy", and "erase", are provided (see FIG. 9).

The operation "create" is a function for creating a new canvas. The operation "copy" is a function for copying the selected canvas. The operation "erase" is a function for erasing the canvas.

Figure 10:
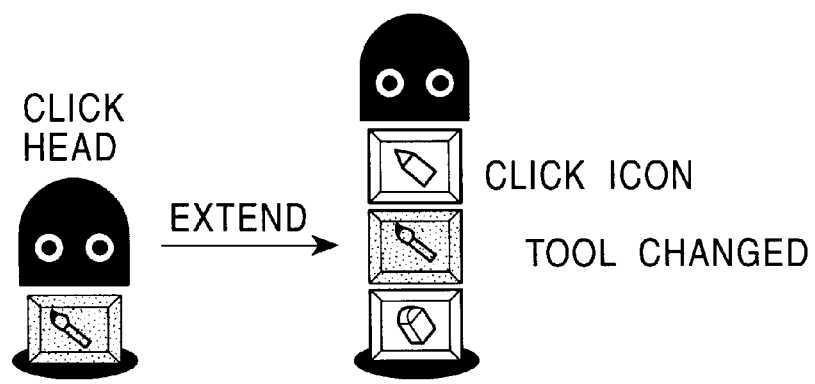
FIG. 10 illustrates a technique for operating the dialog "tool"

The dialog "tool" is used for selecting the pen or the eraser, and is also used for selecting the type of pen. In this embodiment, two types of pen, such as "pen" and "brush" are provided, as shown in FIG. 10.

The pen generates binary lines having a thickness of 1 which are not subjected to anti-aliasing processing. The dialog "brush size" is used for specifying or changing the thickness of the pen point or the eraser selected in the dialog "tool". In this embodiment, there are three types of thickness, such as "thick", "medium", and "thin". With the brush, binary patterns which are not subjected to anti-aliasing processing can be drawn according to a drag operation with a predetermined interval. In addition to the pen and the brush, a "spray" may be provided.

Figure 11:
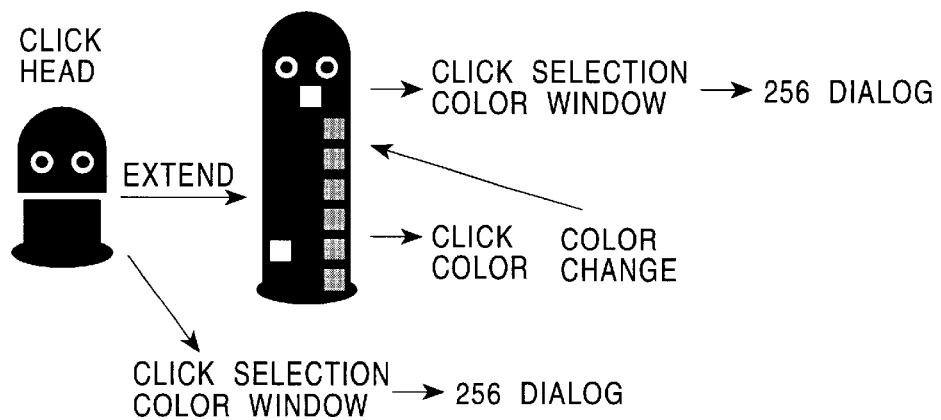
FIG. 11 illustrates a technique for operating the dialog "color palette"

The dialog "color palette" is used for designating the coloration of the pen point. When the dialog "color palette" is clicked, as shown in FIG. 11, a 256-color palette dialog appears. In the example shown in FIG. 11, frequently used colors are arranged on a 3×8 matrix. By clicking a predetermined color on the palette, the color of the pen point is changed.

Figure 12:
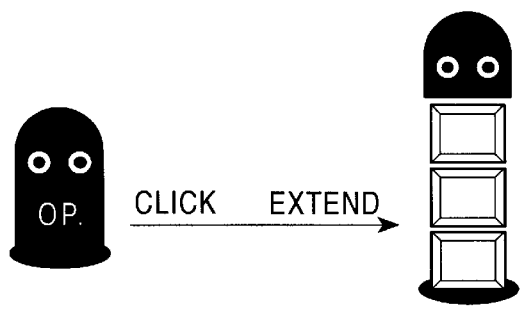
FIG. 12 illustrates a technique for operating the dialog "option"

The dialog "option" is used for selecting one of the optional functions. In this embodiment, three options, such as "texture", "billboard", and "sound", are provided. By clicking on the head of the dialog, the dialog extends upward, and a sub-menu appears, as shown in FIG. 12.

The option "texture" is a function for reading texture and mapping it on a currently opened canvas. The texture is usually provided in an image file format, such as png or jpeg.

The option "billboard" is a function for converting a currently opened canvas into a billboard type (default canvas is not a billboard type). According to the billboard type, the canvas can be rotated around the Y axis, thereby directing the canvas toward the user's viewpoint.

The option "sound" is a function for arranging sound (BGM) in the three-dimensional space. With this function, one sound can be pasted to each canvas. Each sound is managed by a sound identification (ID) number.

Figure 13:
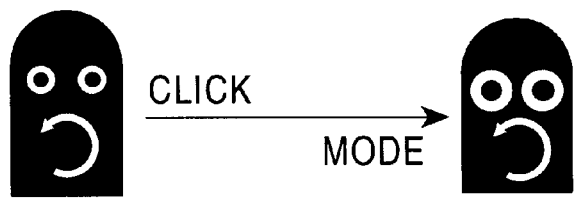
FIG. 13 illustrates a technique for operating the dialog "undo"

The dialog "undo" is used for canceling a rendering operation performed on the canvas by the user. For example, the rendering operations are canceled according to the number of clicks performed on the dialog with the mouse 23 (see FIG. 13).

The dialog "walk" is used for vertically and horizontally shifting the viewing point in the three-dimensional space in which the canvas is disposed. When the head of the dialog is clicked, it extends upward to show a sub-menu formed of buttons indicating the forward, backward, left, and right directions of the viewing point (see FIG. 14).

The dialog "target" is used for calling the "target" function when, for example, a plurality of canvases are disposed on the image editing screen. The "target" function is a function for shifting the screen to the front face of the clicked canvas. In this case, the movement of the "target" may become more complicated by considering the normal of the target canvas or adding the "slow-in slow-out" motion.

Figure 15:
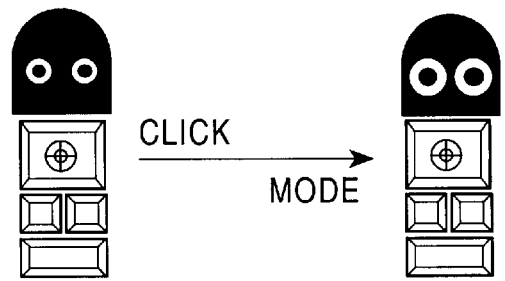
FIG. 15 illustrates a technique for operating the dialog "target"

When the head of the dialog "target" is clicked, it extends upward to show a sub-menu consisting of the individual buttons for designating the target (see FIG. 15). Three buttons, such as "target", "before or after", and "home", are included in the sub-menu.

By designating the canvas with the mouse 23 and clicking on the button "target", the designated canvas appears. When the button "before or after" is clicked, the canvas which is set before or after the canvas to be edited appears. When the button "home" is clicked, the predetermined home position appears.

Figure 16:
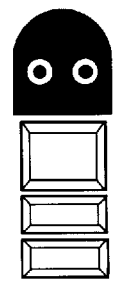
FIG. 16 illustrates a technique for operating the dialog "line of sight"

The dialog "line of sight" is used for calling a function for vertically moving the viewing point on the image editing screen. When the head of the dialog is clicked, it extends upward to show a sub-menu consisting of buttons for specifying the vertical movement of the viewing point and a button for resetting the line of sight (see FIG. 16).

Figure 17:
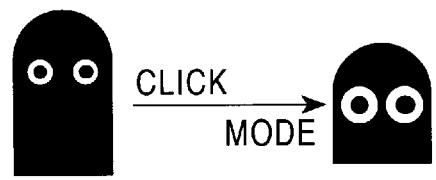
FIG. 17 illustrates a technique for operating the dialog "top view"

The dialog "top view" is used for calling a function for rotating the viewing point by 90 degrees to view the ground from above. When the head of the dialog is clicked, it slightly contracts downward so that the character appears to look down to the ground (see FIG. 17).

The dialog "help" is used for calling a help function. When the image editing system 10 (FIG. 1) is connected to an external network, the help function may operate in association with online help.

Figures 3, 4:
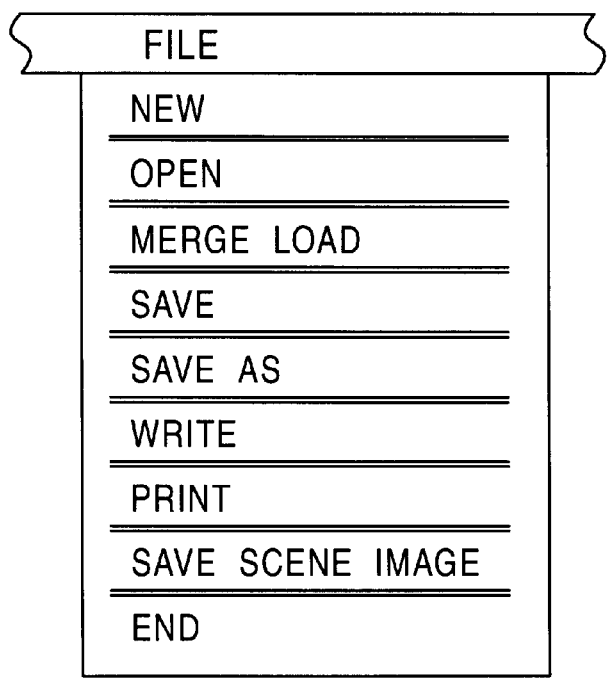
FIG. 3 illustrates an example of a menu bar disposed at the uppermost portion of the image editing/processing screen.
FIG. 4 illustrates an example of a pull-down menu displayed when a menu "file" is selected.

FIG. 3 illustrates an example of the menu bar disposed, for example, at the uppermost portion of the image editing screen. The menu bar includes, as shown in FIG. 3, a plurality of menu items, such as "file", "edit", "view", "scene option", and "end".

FIG. 4 illustrates an example of a pull-down menu displayed when the menu item "file" is selected. The pull-down menu includes, as shown in FIG. 4, a plurality of sub-menu items, such as "new", "open", "merge load", "save", "save as", "write", "print", "save scene image", and "end".

The sub-menu item "new" is used for suspending currently edited data and starting to create a new image. If the current data is unsaved, the user is asked whether the current data is to be saved. The current data can be saved only with the current file name.

The sub-menu item "open" is used for opening the stored data, and is implemented by a standard file dialog in the user interface of, for example, Windows.

The sub-menu item "merge load" is used for providing additional data to the current data, and is implemented by a standard file dialog in the user interface of, for example, Windows.

The sub-menu item "save" is used for saving the currently edited image data with the current file name. The sub-menu item "save as" is used for saving the data with another file name. The items "save" and "save as" are implemented by a standard file dialog in the user interface of, for example, Windows.

The sub-menu item "write" is used for starting to write the created image data in the Virtual Reality Modeling Language (VRML) 2.0 format, and is implemented by a standard file dialog in the user interface of, for example, Windows.

The sub-menu item "print" is used for printing out a three-dimensional scene on the screen. The three-dimensional scene is preferably printed out in WYSIWYG without the pull-down menus. The sub-menu item "print" is implemented by a standard file dialog in the user interface of, for example, Windows.

The sub-menu item "save scene image" is used for saving a scene image in an image file, and it is preferably saved in WYSIWYG without the pull-down menus. The item "save scene image" is implemented by a standard file dialog in the user interface of, for example, Windows.

The sub-menu item "end" is used for ending the image editing application. If the currently edited image data is unsaved, the user is asked whether the data is to be saved. The current data can be saved only with the current file name.

Figure 5:
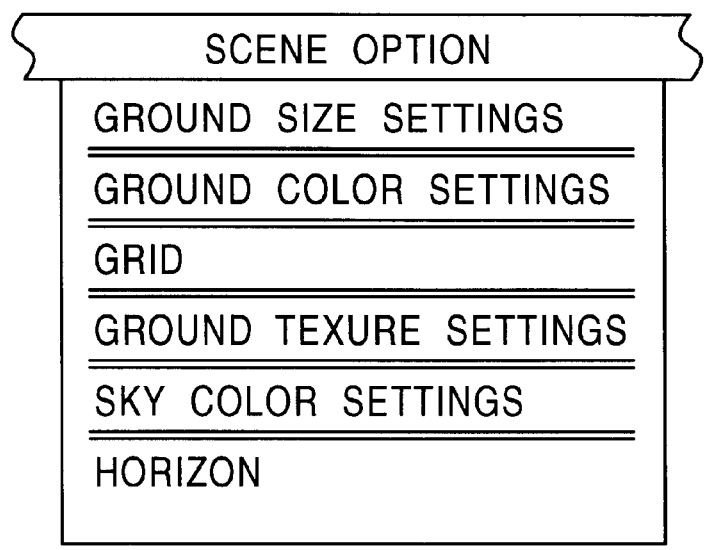
FIG. 5 illustrates an example of a pull-down menu displayed when a menu "scene option" is selected.

FIG. 5 illustrates an example of the pull-down menu displayed when the "scene option" menu is selected. The pull-down menu includes, as shown in FIG. 5, a plurality of sub-menu items, such as "ground size settings", "ground color settings", "grid", "ground texture settings", "sky color settings", and "horizon".

The sub-menu item "ground size settings" is used for setting the ground size, and the default ground size is set to be, for example, 20 m×20 m. If the construction of a town is implemented in the three-dimensional space in the future, the ground size setting function will be important. The sub-menu item "ground color settings" is used for setting the color or the coloration of the ground, and the initial value is set to be a monochromatic color. The sub-menu item "ground texture settings" is used for designating the pattern/texture pasted on the ground.

The sub-menu item "grid" is used for displaying a grid pattern on the ground. With this function, a three-dimensional distance can be shown in the three-dimensional space.

The sub-menu item "sky color settings" is used for specifying the color of the sky in the background, and has two-dimensional vertical gradations.

The sub-menu item "horizon" is used for specifying the height of the horizon on the image editing screen. The portion under the horizon is displayed in the color designated by the "ground color settings" menu rather than the color of the sky.

A description is now given of the three-dimensional image rendering processing implemented on the image editing system 10 constructed in accordance with the first embodiment of the present invention.

The overall flow of the rendering processing performed by the image editing system 10 is indicated by the following procedure (1) through (6).

(1) A three-dimensional space including only a horizon (see FIG. 2) appears.

(2) A user draws a stroke line (which means a freehand line) in the three-dimensional space.

(3) A wall using the stroke line as a base line appears. If the stroke line is a curve, the wall also becomes a curved surface.

(4) The user then draws a picture on the wall as a canvas. The picture is mapped on the wall, resulting in a three-dimensional picture.

(5) The user draws another wall to set a new canvas, and draws a picture on the wall. By repeatedly drawing pictures on the canvases, the user is able to construct a desired three-dimensional scene.

(6) By the rotation of the canvas or the shift of the viewing point, a three-dimensional image can be rendered. This can be implemented by using the corresponding dialog menu as discussed above.

A description is now given, with reference to FIGS. 18 through 23, of an example of the three-dimensional rendering processing performed by the image editing system 10.

Figure 18:
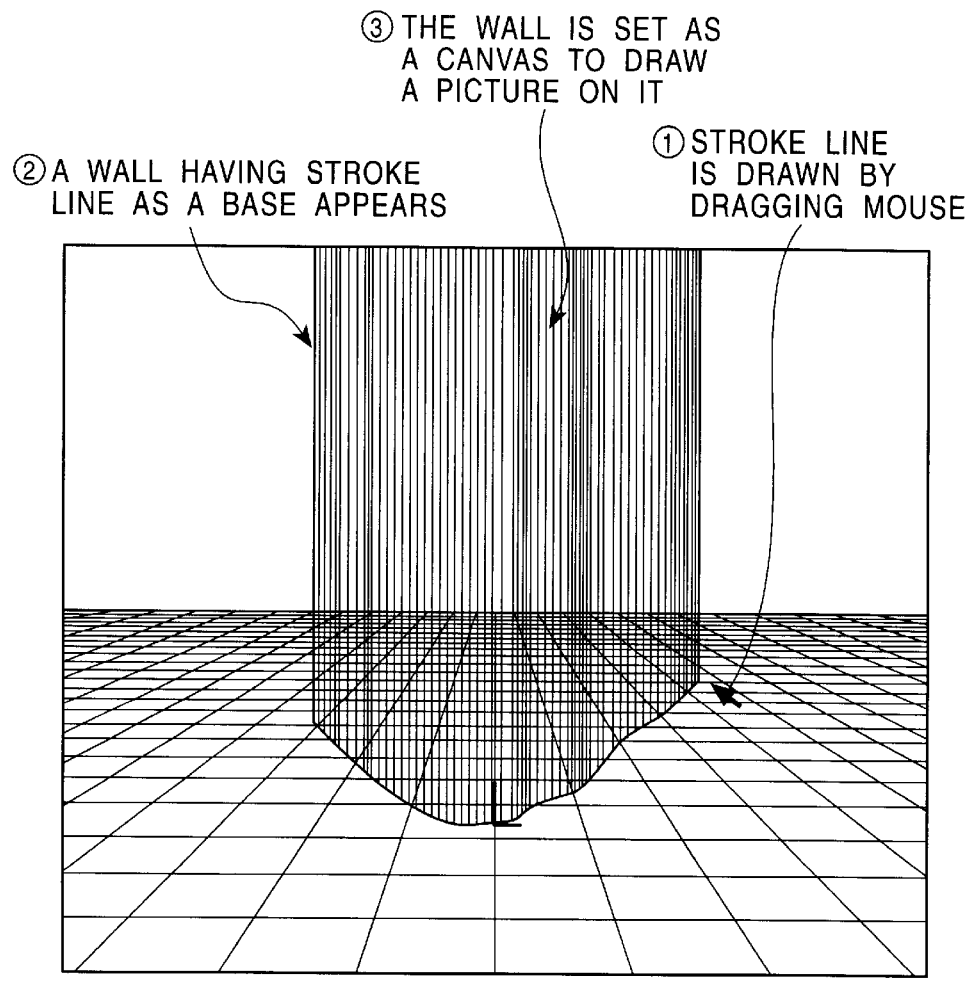
FIGS. 18 through 29 illustrate a three-dimensional image being drawn in the image editing/processing system shown in FIG. 1.

A stroke line is drawn by dragging the mouse 23 on the ground in the three-dimensional space including only the horizon (see FIG. 2). In response to this user input operation, a wall using the stroke line as a base line appears, as shown in FIG. 18. If the stroke line is a curve, the wall also becomes a curved surface.

Figure 19:
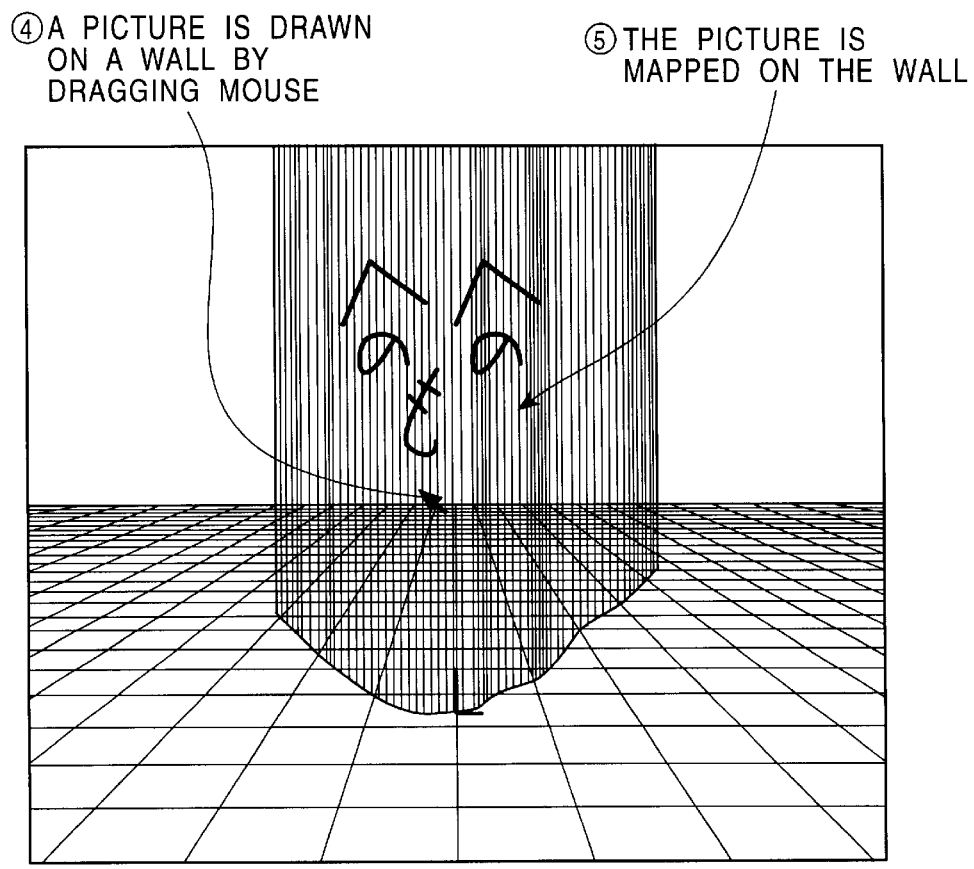

The wall serves as a canvas, and the user is able to draw a picture on the canvas. That is, the user is able to draw a picture on the wall by dragging the mouse 23, as shown in FIG. 19. In this case, the type, the thickness, and the color of the pen can be specified by using, for example, the corresponding dialog menus, as discussed above. Alternatively, the eraser may be selected to erase the drawn line.

The picture drawn on the wall is directly mapped onto the wall, i.e., the canvas, resulting in a three-dimensional picture. In the example shown in FIG. 19, a face is drawn.

Figure 20:
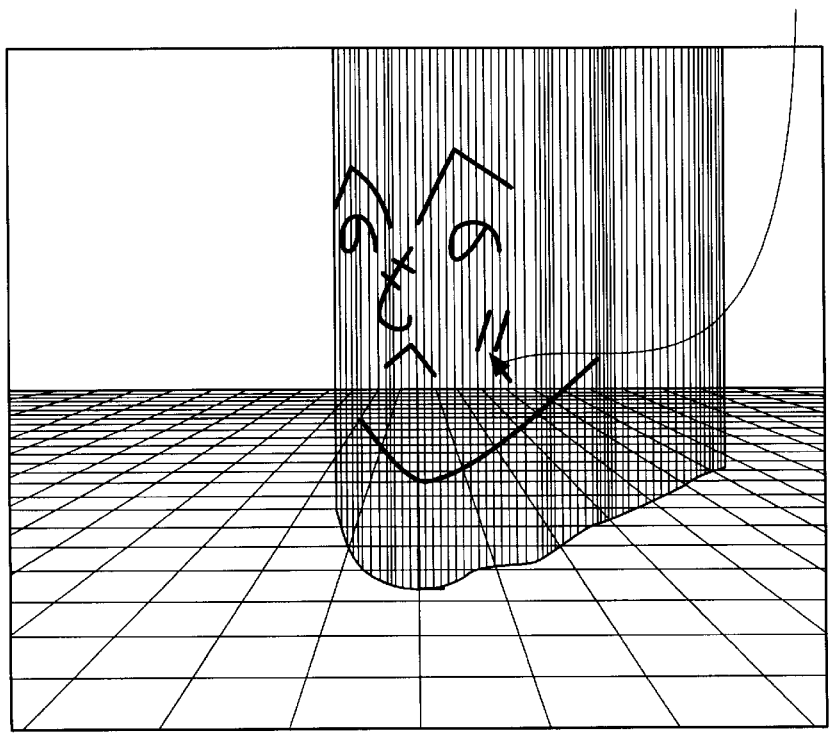

As stated above, the user is able to rotate the canvas or to move the viewing point by using the corresponding dialog menu, as shown in FIG. 20, thereby obtaining a desired three-dimensional scene.

Figure 21:
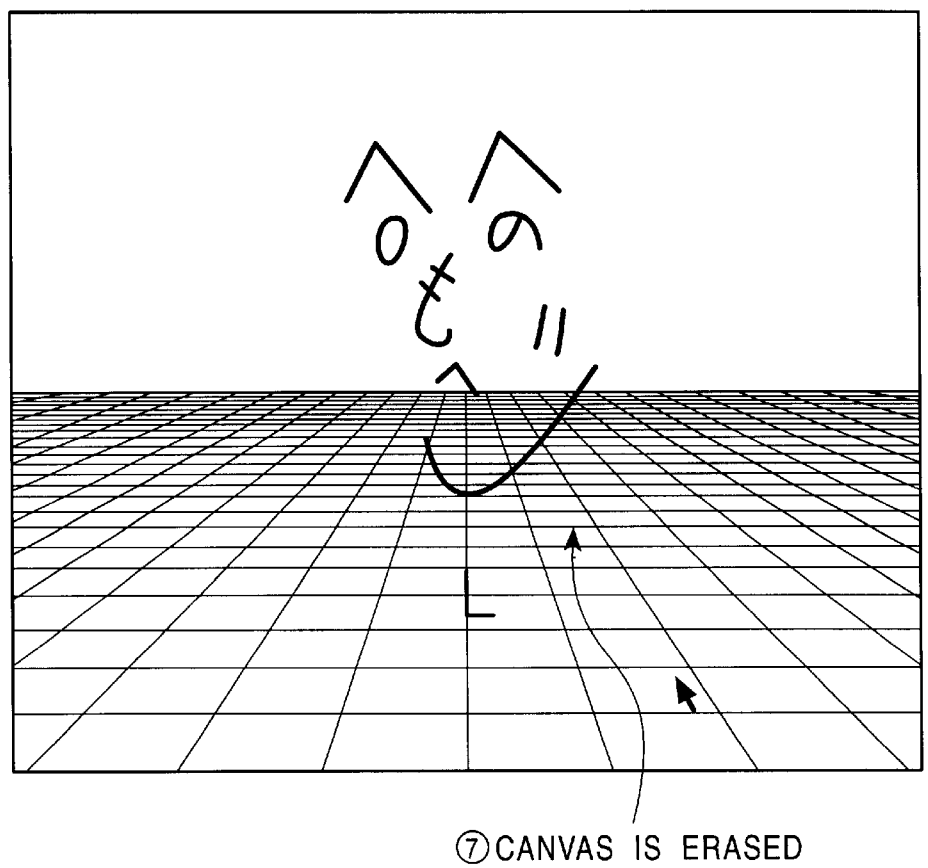

The canvas can be erased from the screen by using the "canvas" dialog, as discussed above. As a result, only the horizon and the three-dimensional picture are left on the image editing screen, as shown in FIG. 21.

Figure 22:
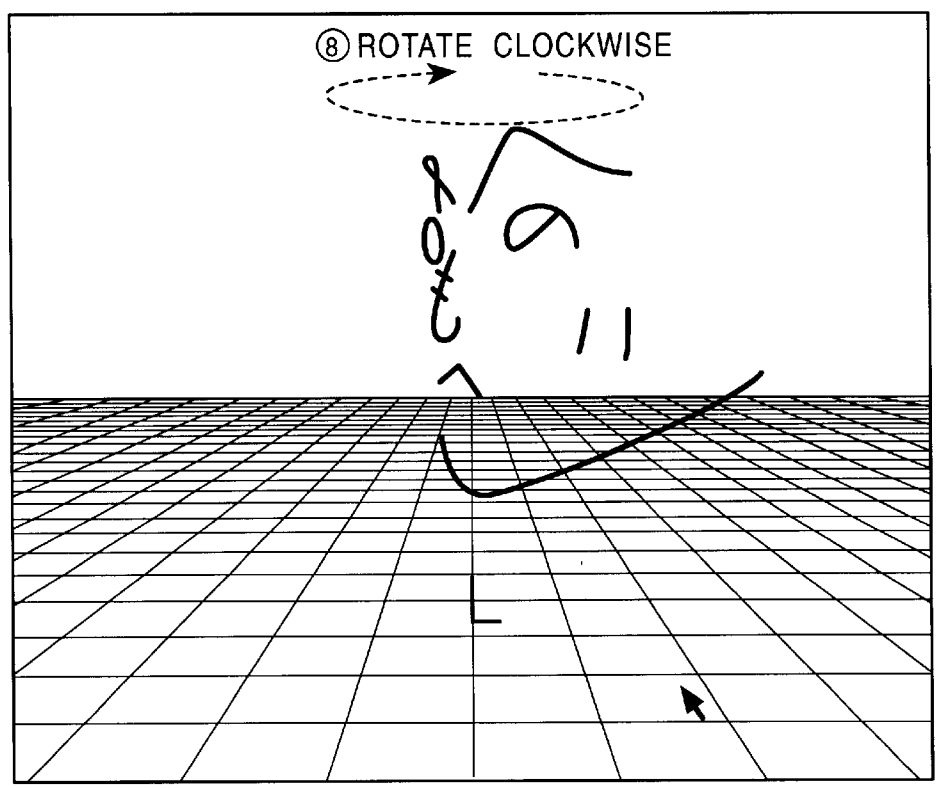
Figure 23:
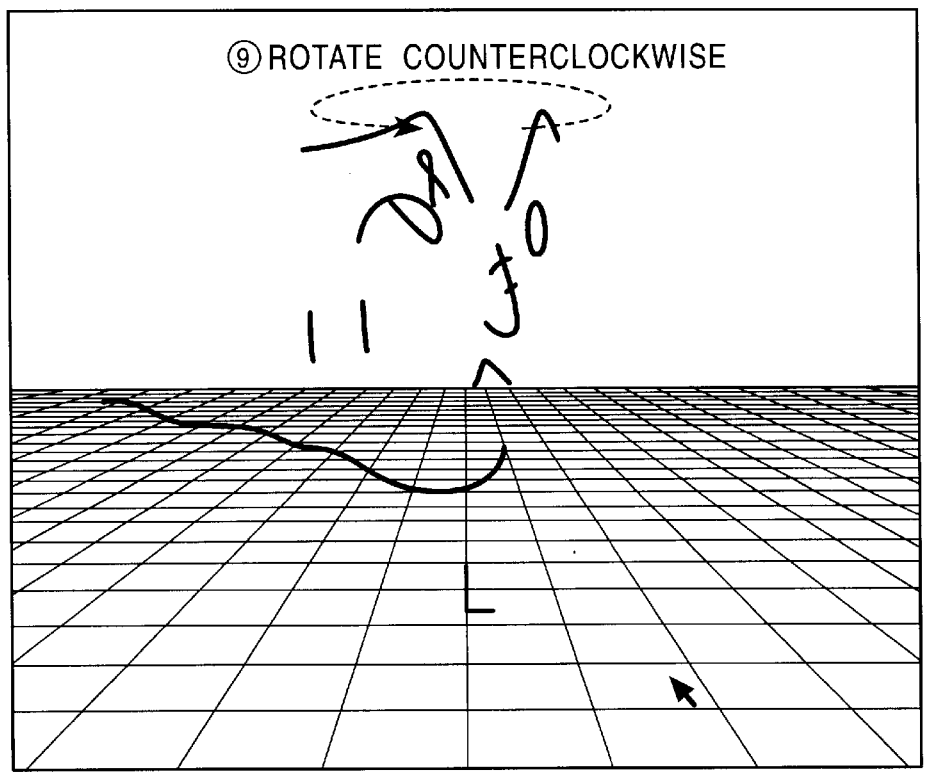

After erasing the canvas, the three-dimensional image can be rotated or the viewing point can be moved according to the corresponding operation. FIG. 22 illustrates the three-dimensional image rotated clockwise around the Z axis, and FIG. 23 illustrates the three-dimensional image rotated counterclockwise around the Z axis.

Another example of the three-dimensional image rendering processing performed by the image editing system 10 is discussed below with reference to FIGS. 24 through 29.

A stroke line is first drawn by dragging the mouse 23 on the ground in the three-dimensional space including only the horizon (not shown). In response to this operation, a wall using the stroke line as a base line appears. The wall serves as a canvas. The user is then able to draw a picture of trees on the canvas, as shown in FIG. 24.

Figure 24:
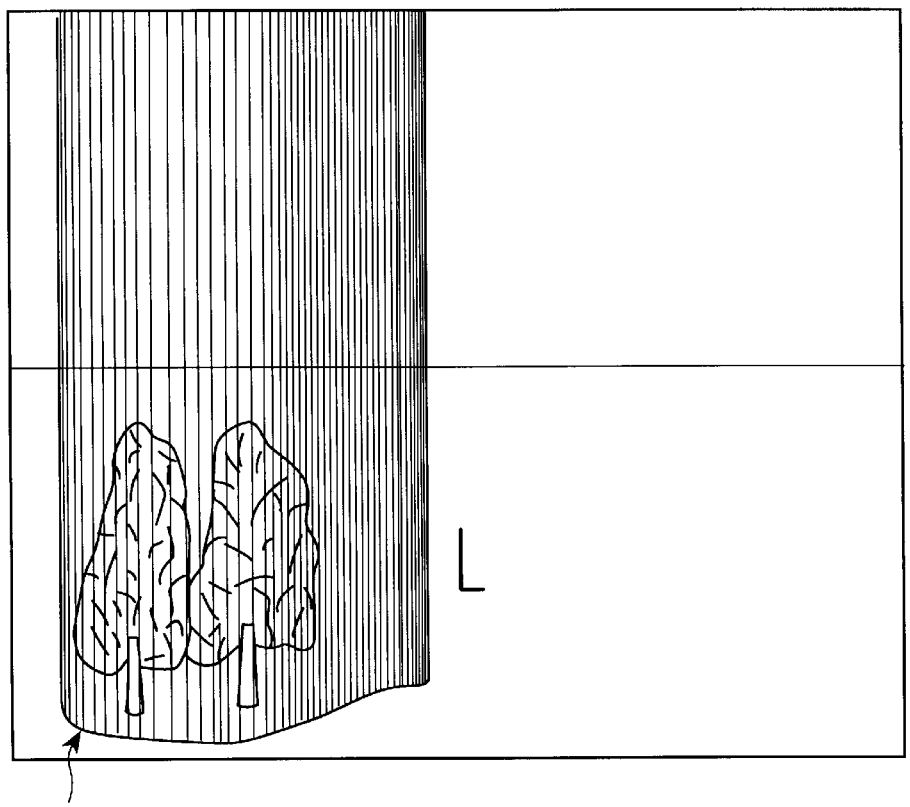
Figure 25:
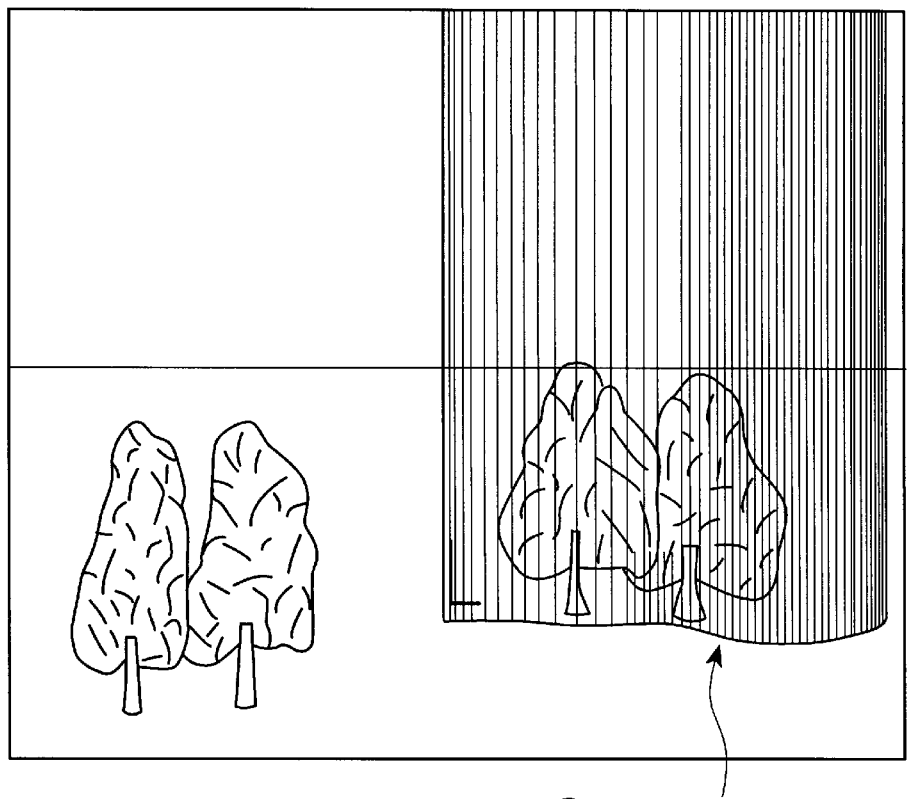

Another stroke line is drawn in a different place in the three-dimensional space (for example, a place farther backward than the canvas shown in FIG. 24) so as to set a wall, i.e., a new canvas. The user then draws a picture of trees on the new canvas, as shown in FIG. 25. By setting the new canvas, the previous canvas temporarily disappears from the image editing screen.

Figure 26:
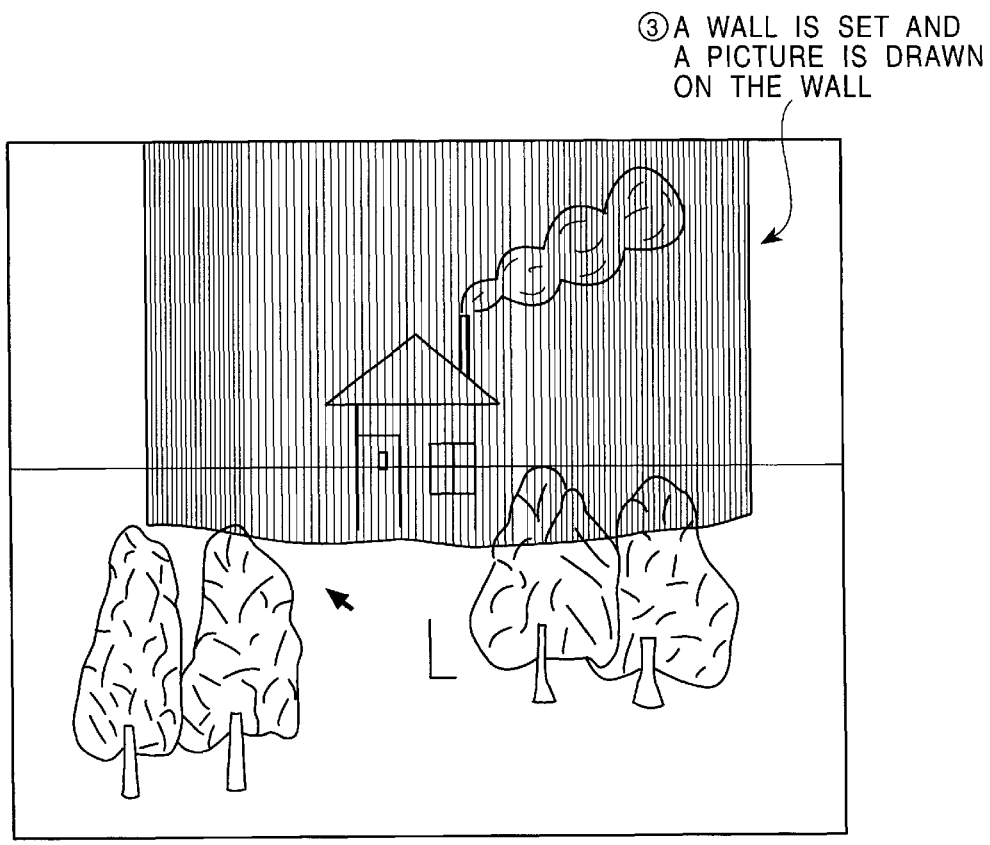

Moreover, another stroke line is drawn in a different place in the three-dimensional space (for example, a place farther backward than the canvases shown in FIGS. 24 and 25) so as to set a wall, i.e., a new canvas. The user then draws a picture of a house, as shown in FIG. 26. By setting the new canvas, the previous canvas temporarily disappears from the image editing screen.

Figure 27:
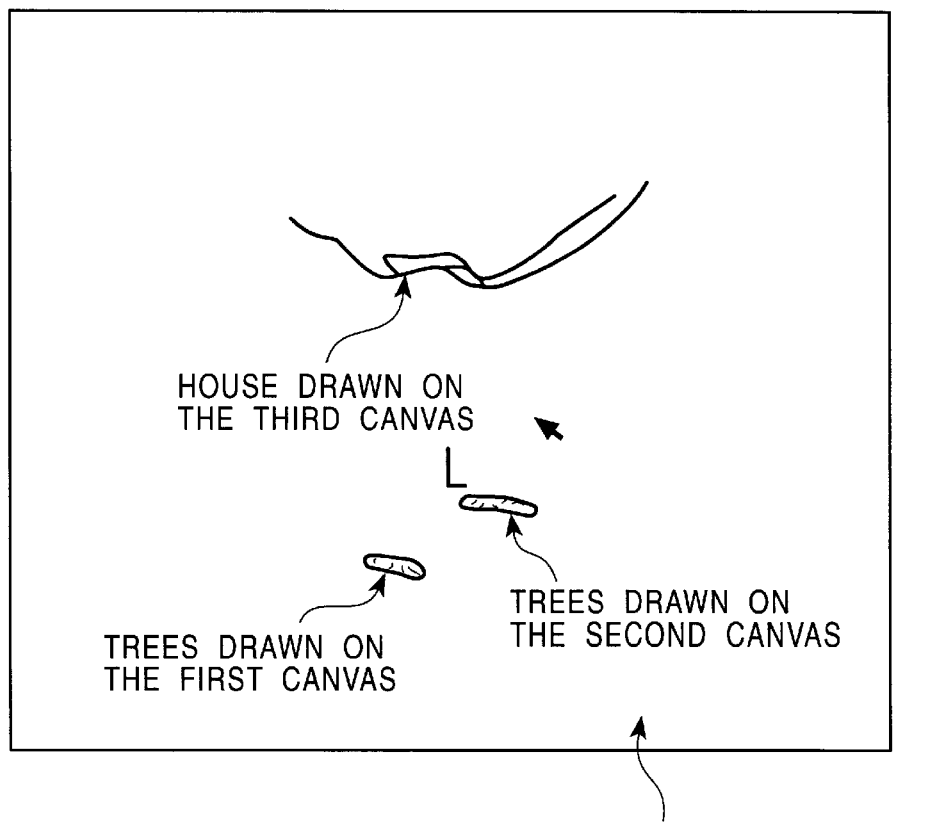

Subsequently, by using, for example, the "top view" dialog, the viewing point of the screen is rotated by 90 degrees to enable the user to look down on the ground from the above (see FIG. 27). In this case, the top view of the trees drawn on the first canvas, the trees drawn on the second canvas, and the house drawn on the third canvas can be observed on the screen.

Figure 28:
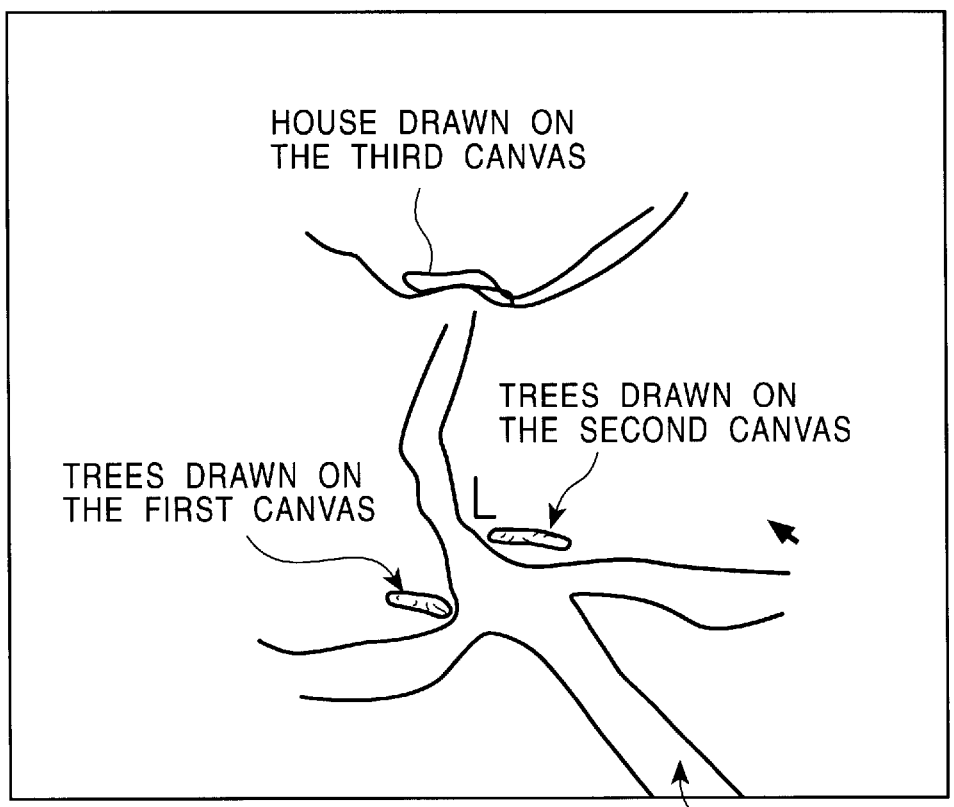
Figure 29:
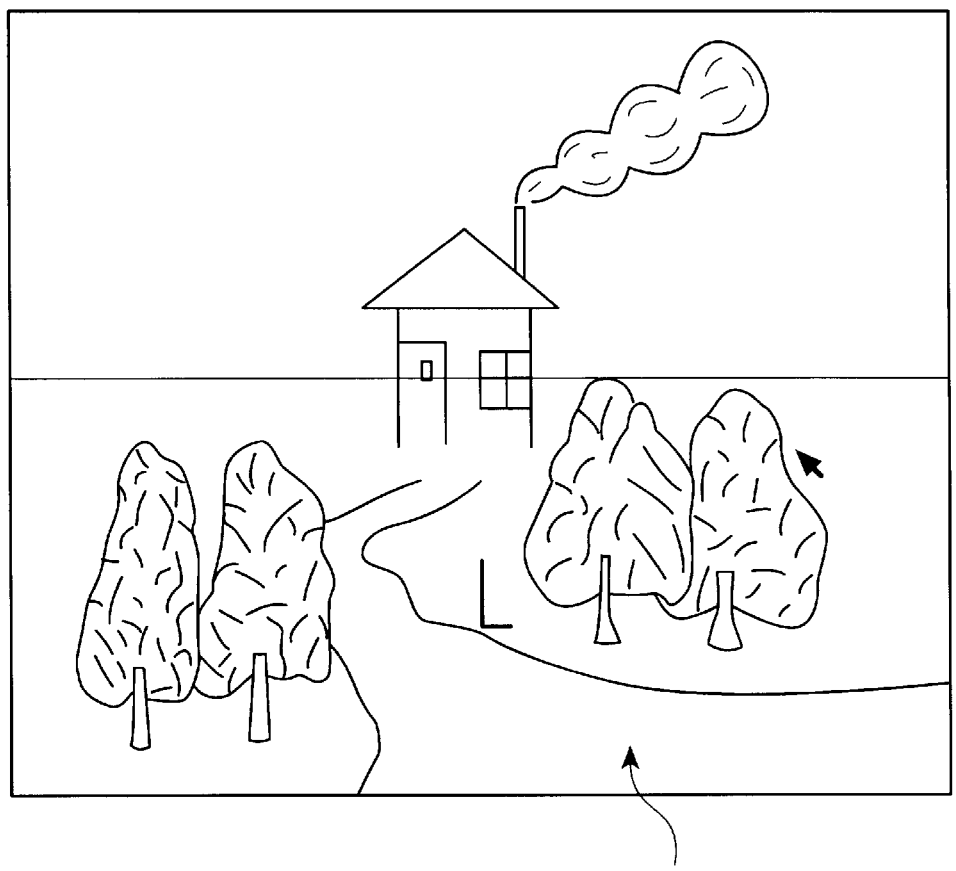

Then, the user draws a stroke line on the ground so as to draw a road on the ground, as shown in FIG. 28. It is to be understood that a picture can be drawn on the ground by dragging the mouse 23 in a manner similar to the pictures drawn on the wall, i.e., on the canvas.

Then, by using the "top view" dialog, the viewing point is returned to the original position. As a result, a three-dimensional image having a landscape formed of the four trees and the house shown in FIG. 26 and the road created as shown in FIG. 28 can be obtained (see FIG. 29).

By setting a wall at a position closer to the horizon, the user is able to draw a picture farther backward. Conventionally, only a rough picture can be drawn on a backward portion of the canvas. However, the user is able to go closer to the backward portion by moving the viewing point, and thus, a more detailed picture can be drawn.

Although in the example shown in FIGS. 24 through 29 the walls are drawn and the pictures are drawn on the walls three times, more walls and pictures may be drawn. By repeatedly setting canvases and drawing pictures on the canvases, a more complicated image can be drawn.

Figure 30:
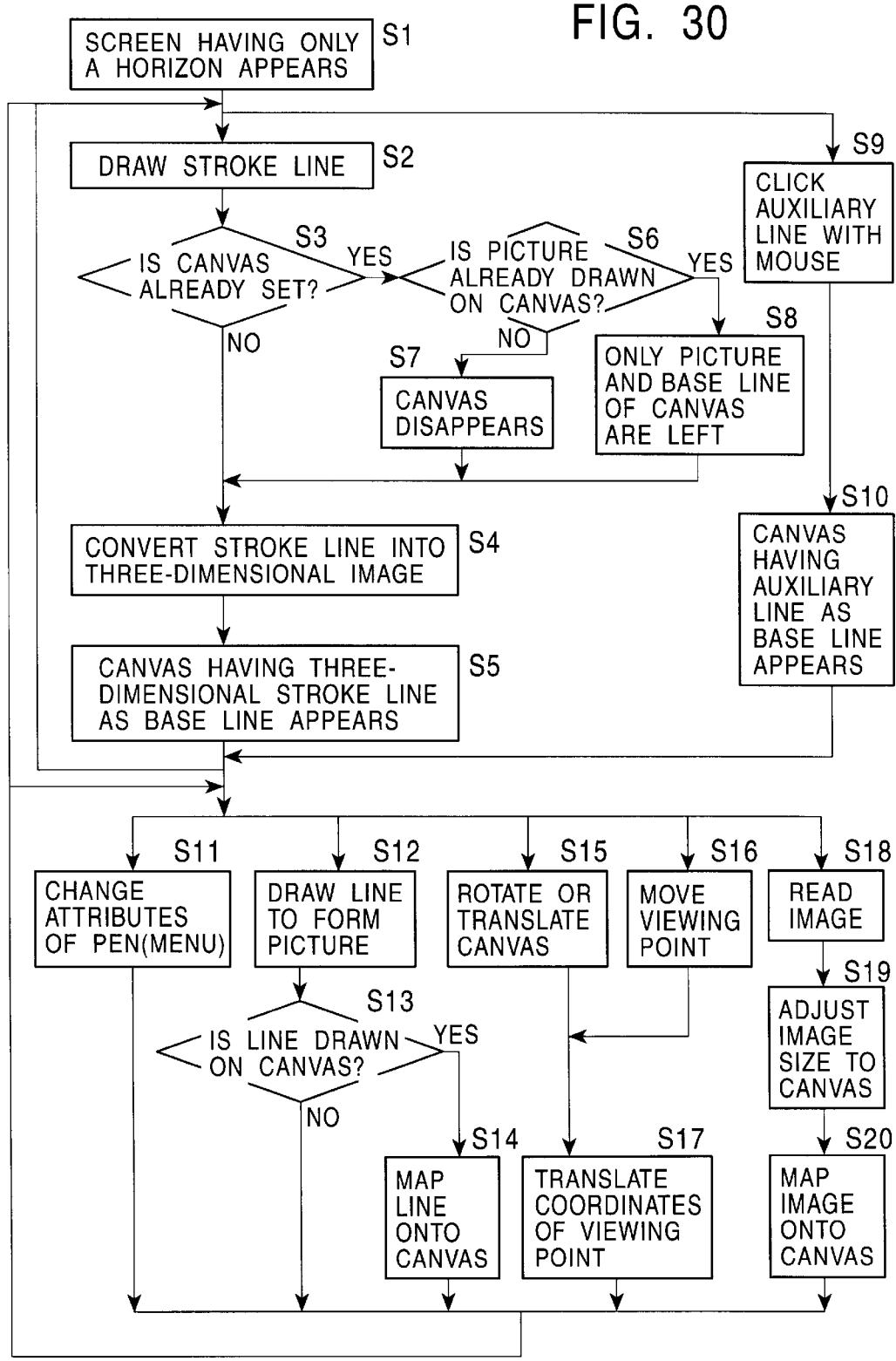
FIG. 30 is a flow chart illustrating the three-dimensional editing process performed by the image editing/processing system shown in FIG. 1.

FIG. 30 is a flow chart illustrating the three-dimensional image editing process implemented by the image editing system 10. This process may be implemented by executing predetermined program code on a computer system. The image editing processing is discussed in detail below according to this flow chart.

The image editing system 10 is started (or the image editing application is run on the computer system). Then, in step S1, a three-dimensional screen having only a horizon (see FIG. 2) appears. In step S2, a stroke line is drawn by dragging the mouse 23.

It is then determined in step S3 whether a canvas is already set on the screen. If the outcome of step S3 is no, the process proceeds to step S4 in which the stroke line drawn in step S2 is converted into a three-dimensional image and is set on the ground. Then, in step S5, a canvas having the three-dimensional stroke line as a base line appears on the screen.

If it is determined in step S3 that a canvas is already set on the screen, the process proceeds to step S6 in which it is determined whether a picture is drawn on the canvas. If the result of step S6 is no, the canvas disappears in step S7. The process then returns to step S4 in which the stroke drawn in step S2 is converted into a three-dimensional line and is set on the ground. Then, in step S5, a canvas having the three-dimensional stroke line as a base line appears on the screen.

If it is found in step S6 that a picture is already drawn on the canvas, the process proceeds to step S8 in which only the picture and the base line (i.e., an auxiliary line) of the canvas are left on the screen. Then, in step S4, the stroke line drawn in step S2 is converted into a three-dimensional line and is set on the ground. In step S5, a canvas having the three-dimensional stroke as a base line appears on the screen.

If, in step S9, the auxiliary line, i.e., the base line of the canvas, is clicked with the mouse 23, the process proceeds to step S10 in which a canvas having the auxiliary line as a base line appears.

When a canvas appears on the screen, the process enters a drawing mode in which the user is able to draw a picture on the canvas. In the rendering mode, the user is able to perform operations, such as "changing the attributes of the pen" (step S11), "drawing lines to form a picture" (step S12), "rotation and translation of the canvas" (step S15), "moving the viewing point" (step S16), and "reading an image" (step S18).

The attributes of the pen can be changed on the property window (not shown) opened by, for example, clicking on the right button of the mouse 23. Alternatively, by using the dialog "tool" (see FIG. 10), the type and the thickness of the pen may be changed. The color of the pen point may also be selected by using the dialog "color palette" (see FIG. 11).

A line can be drawn to form a picture by dragging the mouse 23 on the currently displayed canvas. If it is found in step S13 that a line is drawn on the canvas, it is mapped onto the canvas in step S14, and is handled as three-dimensional graphic data in the subsequent processing.

Figure 14:
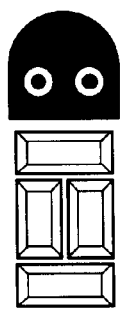
FIG. 14 illustrates a technique for operating the dialog "walk"

The canvas can be rotated or translated by using the dialog "walk" (see FIG. 14). The viewing point can be moved by using the dialog "line of sight" (see FIG. 16). When an instruction is given to rotate or translate the canvas or to move the viewing point, the coordinates of the viewing point are translated in step S17, and the screen display is updated.

It is not essential that the user draw a new picture, in which case, for example, an image file stored in a hard disk may be read and edited in step S18. In this case, the size of the read image is adjusted to the canvas in step S19, and the image is mapped onto the canvas in step S20.

In the first embodiment, the three-dimensional images created from the two-dimensional images are still images. To further develop the first embodiment of the present invention, moving pictures are created from three-dimensional images created and edited in the three-dimensional space according to a second embodiment of the present invention.

The configuration of an image processing system 10 according to the second embodiment is similar to that of the image editing system 10 shown in FIG. 1, and the elements same as those of the image editing system 10 are designated with like reference numerals, and an explanation thereof will thus be omitted. In the second embodiment, however, an image processing application is used instead of the image editing application used in the first embodiment.

The three-dimensional image processing performed by the image processing system 10 is as follows. The image processing consists of two processes, i.e., a first process for pasting a two-dimensional image onto a canvas which is set in a three-dimensional space and for creating a three-dimensional image, and a second process for adding motion to the created three-dimensional image.

The first process for creating a three-dimensional image from a two-dimensional image is similar to the three-dimensional image editing processing discussed in the first embodiment with reference to FIGS. 18 through 23, and an explanation thereof will thus be omitted.

It is to be understood that an image file stored in a local disk may be read and pasted on the canvas set in the three-dimensional space instead of pasting a two-dimensional image drawn by dragging the mouse 23.

Details of the three-dimensional image process performed by the image processing system 10 are similar to those of the three-dimensional image editing process discussed with reference to FIG. 30, and an explanation thereof will thus be omitted.

In the second embodiment, a plurality of canvases may be set in a single three-dimensional space, and a two-dimensional image may be pasted onto each canvas. In this case, a three-dimensional scene formed of a plurality of three-dimensional objects can be created.

The second image process performed by the image processing system 10, i.e., the process for providing motion to the three-dimensional image created by the first process (image editing operation), is discussed below.

Figure 31:
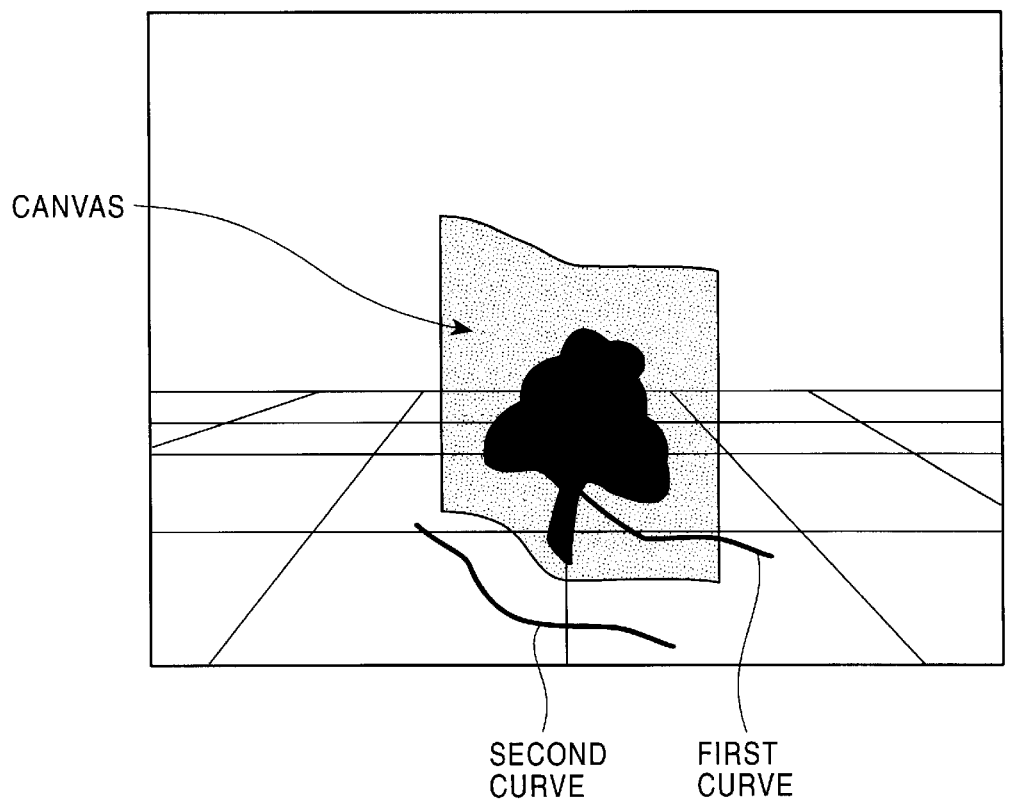
FIG. 31 illustrates base lines, such as first and second curves, of two canvases in a three-dimensional space.

In addition to the base line of the canvas set in the first image process (image editing operation), the user sets a base line of another canvas in the three-dimensional space. FIG. 31 illustrates the image processing screen on which base lines, i.e., first and second curves, of two canvases are set in the three-dimensional space.

Figure 32:
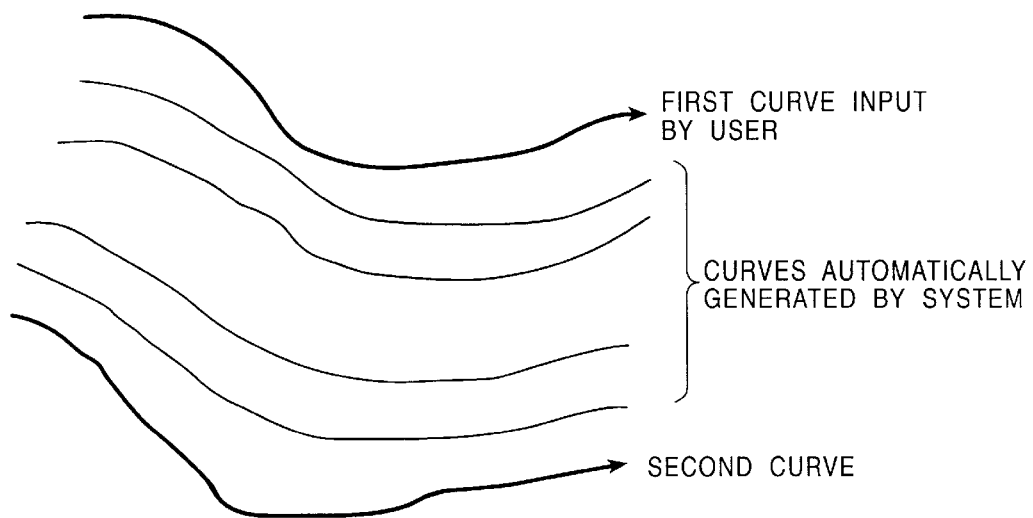
FIG. 32 illustrates interpolation curves for interpolating the first and second curves.

In this case, a plurality of curves for interpolating the first and second curves are automatically generated in the image processing system 10. FIG. 32 illustrates curves for interpolating the first and second curves.

In the image processing system 10, the base line of the canvas is sequentially and constantly shifted from the first curve to the second curve via the automatically generated interpolation curves, and then from the second curve to the first curve via the interpolation curves. As a result, the three-dimensional image pasted on the canvas is moved in accordance with the movement of the canvas. Thus, it appears to the user that the three-dimensional image is animating.

Concerning the automatic generation of the interpolation curves, a technique indicated in "A Physically Based Approach to 2-D Shape Blending" by Thomas W. Sederberg (ACM Computer Graphics, 26, Jul. 2, 1992) may be employed.

Regular three-dimensional coordinate translation processing in the geometric field may be employed for pasting a three-dimensional image to each canvas generated in accordance with the movement of the base line.

The number of additional base lines set by the user may be more than two.

It is not essential that the user set the base line of another canvas. Alternatively, another base line may be automatically generated in the image processing system 10 based on the base line of the canvas set in the first process (image editing operation).

Figure 33:
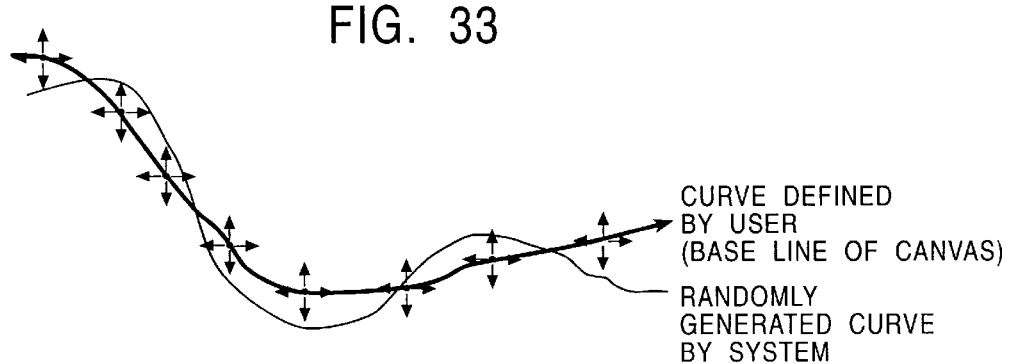
FIG. 33 illustrates an example of a technique for automatically generating another base line based on the base line of the canvas which is set during the image editing operation in the image processing system.

FIG. 33 illustrates an example of a technique for automatically generating other lines in the image processing system 10 based on the base line of the canvas set in the first process.

As shown in FIG. 33, a plurality of control points are set on one of the curves forming the base line of the canvas. Then, each control point is constantly displaced in the top, down, right, and left directions according to random numbers.

As a result, the base line of the canvas is randomly transformed based on the first curve. Then, the three-dimensional image pasted on the canvas is moved in accordance with the movement of the canvas. Thus, it appears to the user that the three-dimensional image is vibrating.

Figure 34:
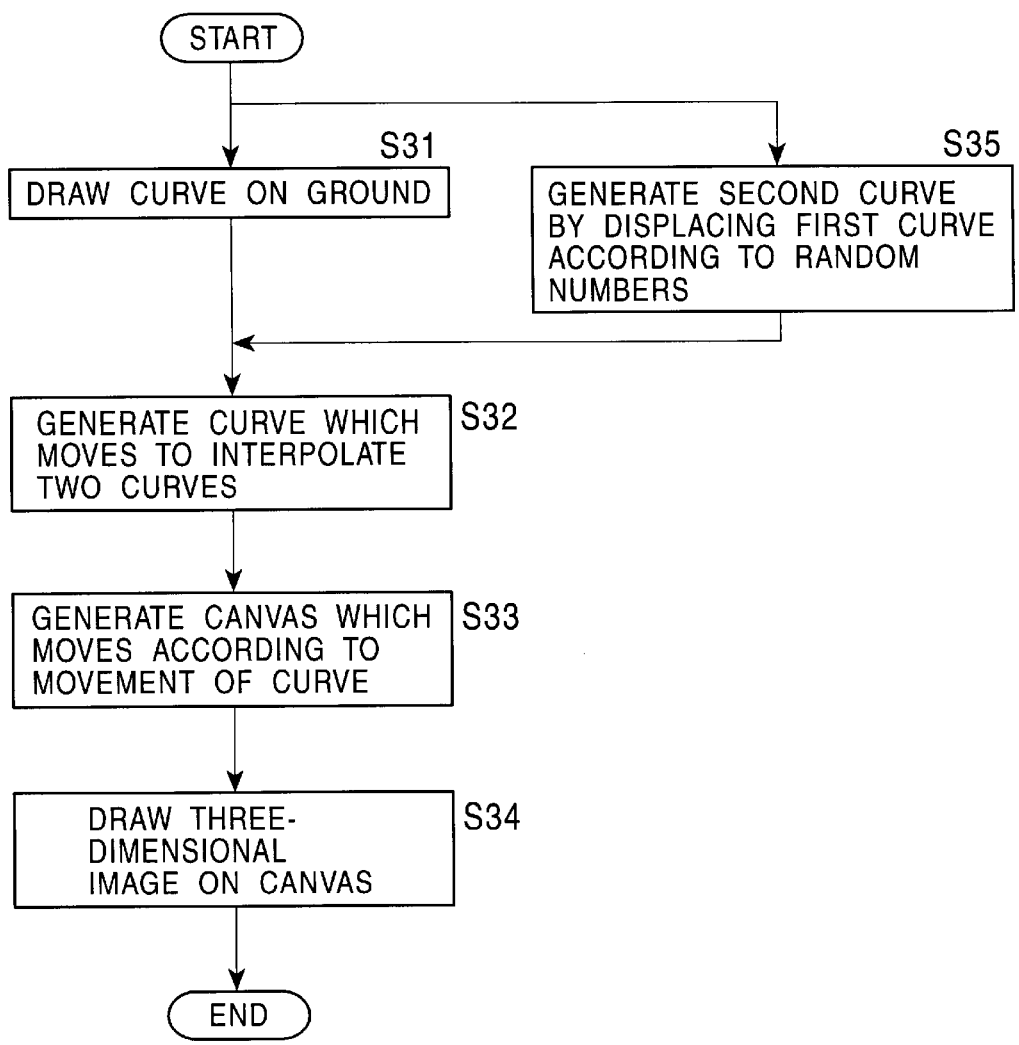
FIG. 34 is a flow chart illustrating the image process performed by the image processing system.

FIG. 34 is a flow chart illustrating the second process of the three-dimensional image processing performed by the image processing system 10 according to the second embodiment of the present invention.

According to this processing, a three-dimensional image can be generated by pasting a two-dimensional image on the canvas which is set in the three-dimensional space, and also animation can be provided to the generated three-dimensional image. Details of the image processing are given below with reference to the flow chart of FIG. 34.

In step S31, a curve is drawn on the ground by, for example, dragging a mouse cursor on the screen of the display device 21. The curve is other than the base line of the canvas which is set in the image editing operation, and is equivalent to the above-described "second curve".

Then, in step S32, a plurality of curves, which are moving to connect (interpolate) the curve forming the base line of the canvas and the curve input in step S31, are generated. As stated above, concerning the generation of the interpolation curves, a technique indicated in "A Physically Based Approach to 2-D Shape Blending" by Thomas W. Sederberg (ACM Computer Graphics, 26, Jul. 2, 1992) may be employed.

On the time axis, each interpolation curve forms the base line of the canvas at the corresponding time. As a result, in step S33, a canvas which is constantly moving in accordance with the movement of the interpolation curves can be generated.

Then, in step S34, a three-dimensional image is drawn on the canvas generated as described above. Thus, it appears to the user that the three-dimensional image is animating.

The second curve is input by the user, as described above. Alternatively, in step S35, the second curve may be automatically created based on the base line of the canvas which is set during the image editing operation.

Figure 35:
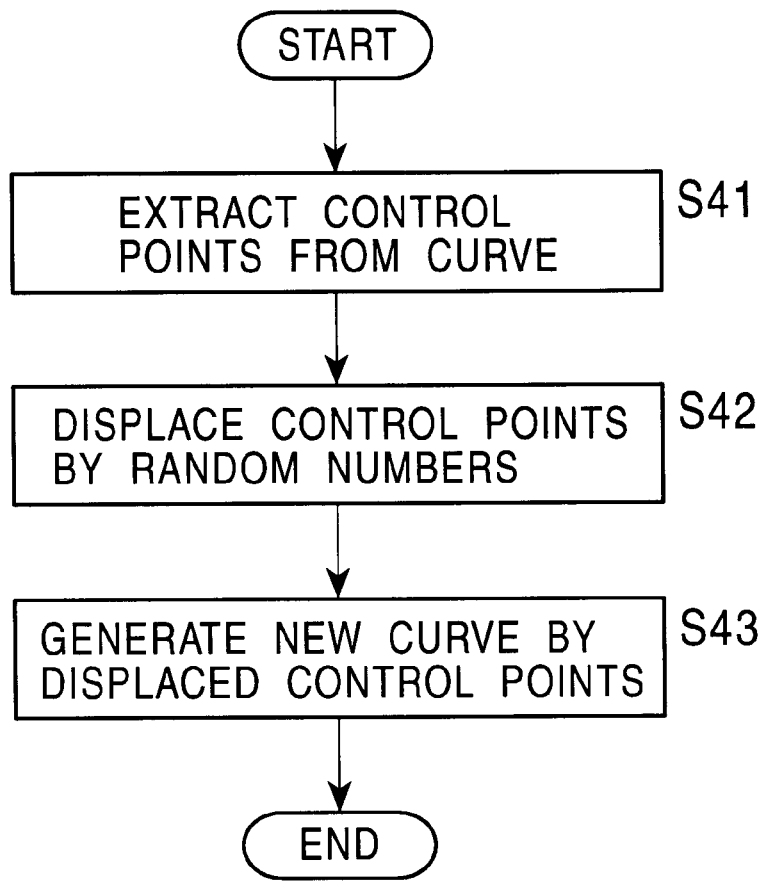
FIG. 35 is a flow chart illustrating details of the process for automatically generating a second curve in step S35 of FIG. 34.

FIG. 35 is a flow chart illustrating details of step S35 of FIG. 34 for automatically generating the second curve.

In step S41, a plurality of control points are set on one of the curves forming the base line of the canvas.

Then, in step S42, each control point is constantly displaced in the top, down, right, and left directions according to random numbers.

As a result, in step S43, another curve different from the first curve can be generated according to the displacements of the control points.

The curve generated in step S43 becomes the base line of the canvas and is randomly changed based on the first curve (see FIG. 33). Since the three-dimensional image pasted on the canvas is moved according to the movement of the canvas, it appears to the user that the three-dimensional image is vibrating.

As discussed above, by moving the three-dimensional image, a three-dimensional sketch becomes realistic-looking. According to this technique, opening and shutting a door or fluttering of a flag can be expressed.

According to the above-described image processing method, an animated three-dimensional world can easily be constructed by using only one picture and a plurality of curves without imposing excessive burden on the user, i.e., the creator of the three-dimensional image.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing system for processing a three-dimensional image, comprising:

image input means for inputting a two-dimensional image;

first-curve setting means for setting a first curve, which serves as a base line of a canvas, in a three-dimensional space;
second-curve setting means for setting a second curve, which is different from the first curve, in the three-dimensional space;
interpolation-curve generating means for generating at least one interpolation curve for interpolating the first curve and the second curve; and
image generating means for creating the three-dimensional image by pasting the image input by said image input means onto the canvas whose base line is one of the first curve, the second curve, and the interpolation curve,
wherein said image generating means constantly moves the base line of the canvas to which the input image is to be pasted between the first curve, the second curve, and the interpolation curve.

2. An image processing system according to claim 1, wherein at least one of said first-curve setting means and said second-curve setting means sets as the first or second curve a stroke line drawn by dragging a mouse by a user in the three-dimensional space including only a horizon.

3. An image processing system according to claim 1, wherein said image input means inputs as the image a stroke line drawn by dragging a mouse onto the canvas by a user.

4. An image processing system according to claim 1, wherein said image input means inputs the two-dimensional image from an image file read from a predetermined storage device.

5. An image processing system for processing a three-dimensional image, comprising:
image input means for inputting a two-dimensional image;
first-curve setting means for setting a first curve, which serves as a base line of a canvas, in a three-dimensional space;
interpolation-curve generating means for generating at least one interpolation curve based on the first curve; and
image generating means for creating the three-dimensional image by pasting the image input by said image input means onto the canvas whose base line is one of the first curve and the interpolation curve,
wherein said interpolation-curve generating means generates the interpolation curve by setting a plurality of control points on the first curve and by displacing the control points by using random numbers.

6. An image processing system for processing a three-dimensional image, comprising:
image input means for inputting a two-dimensional image;
first-curve setting means for setting a first curve, which serves as a base line of a canvas, in a three-dimensional space;
interpolation-curve generating means for generating at least one interpolation curve based on the first curve; and
image generating means for creating the three-dimensional image by pasting the image input by said image input means onto the canvas whose base line is one of the first curve and the interpolation curve,
wherein said interpolation-curve generating means generates the interpolation curve by setting a plurality of control points on the first curve and by constantly displacing the control points by using random numbers.

7. An image processing system for processing a three-dimensional image, comprising:
image input means for inputting a two-dimensional image;
first-curve setting means for setting a first curve, which serves as a base line of a canvas, in a three-dimensional space;
interpolation-curve generating means for generating at least one interpolation curve based on the first curve; and
image generating means for creating the three-dimensional image by pasting the image input by said image input means onto the canvas whose base line is one of the first curve and the interpolation curve,
wherein said image generating means constantly moves the base line of the canvas to which the input image is to be pasted between the first curve and the interpolation curve.

8. An image processing system according to claim 7, wherein said image input means inputs as the image a stroke line drawn by dragging a mouse onto the set canvas by a user.

9. An image processing system according to claim 7, wherein said image input means inputs the two-dimensional image from an image file read from a predetermined storage device.

10. An image processing method for processing a three-dimensional image, comprising:
an image input step of inputting a two-dimensional image;
a first-curve setting step of setting a first curve, which serves as a base line of a canvas, in a three-dimensional space;
a second-curve setting step of setting a second curve, which is different from the first curve, in the three-dimensional space;
an interpolation-curve generating step of generating at least one interpolation curve for interpolating the first curve and the second curve; and
an image generating step of creating the three-dimensional image by pasting the image input in said image input step onto the canvas whose base line is one of the first curve, the second curve, and the interpolation curve,
wherein said image generating step constantly moves the base line of the canvas to which the input image is to be pasted between the first curve, the second curve, and the interpolation curve.

11. An image processing method according to claim 10, wherein at least one of said first-curve setting step and said second-curve setting step sets as the first or second curve a stroke line drawn by dragging a mouse by a user in the three-dimensional space including only a horizon.

12. An image processing method according to claim 10, wherein said image input step inputs as the image a stroke line drawn by dragging a mouse onto the set canvas by a user.

13. An image processing method according to claim 10, wherein said image input step inputs the two-dimensional image from an image file read from a predetermined storage device.

14. An image processing method for processing a three-dimensional image, comprising:
an image input step of inputting a two-dimensional image;
a first-curve setting step of setting a first curve, which serves as a base line of a canvas, in a three-dimensional space;

an interpolation-curve generating step of generating at least one interpolation curve based on the first curve; and an image generating step of creating the three-dimensional image by pasting the image input in said image input step onto the canvas whose base line is one of the first curve and the interpolation curve, wherein said interpolation-curve generating step generates the interpolation curve by setting a plurality of control points on the first curve and by constantly displacing the control points by using random numbers.

15. An image processing method for processing a three-dimensional image, comprising:

an image input step of inputting a two-dimensional image;

a first-curve setting step of setting a first curve, which serves as a base line of a canvas, in a three-dimensional space;

an interpolation-curve generating step of generating at least one interpolation curve based on the first curve; and an image generating step of creating the three-dimensional image by pasting the image input in said image input step onto the canvas whose base line is one of the first curve and the interpolation curve, wherein said image generating step constantly moves the base line of the canvas to which the input image is to be pasted between the first curve and the interpolation curve.

16. An image processing method according to claim 15, wherein said image input step inputs as the image a stroke line drawn by dragging a mouse onto the set canvas by user.

17. An image processing method according to claim 15, wherein said image input step inputs the two-dimensional image from an image file read from a predetermined storage device.

18. A storage medium for physically storing computer-readable software which allows a computer system to execute three-dimensional image processing, said computer-readable software comprising:

an image input step of inputting a two-dimensional image;

a first-curve setting step of setting a first curve, which serves as a base line of a canvas, in a three-dimensional space;

a second-curve setting step of setting a second curve, which is different from the first curve, in the three-dimensional space;

an interpolation-curve generating step of generating at least one interpolation curve for interpolating the first curve and the second curve; and an image generating step of creating the three-dimensional image by pasting the image input in said image input step onto the canvas whose base line is one of the first curve, the second curve, and the interpolation curve, wherein said image generating step constantly moves the base line of the canvas to which the input image is to be pasted between the first curve, the second curve, and the interpolation curve.

19. A storage medium for physically storing computer-readable software which allows a computer system to execute three-dimensional image processing, said computer-readable software comprising:

an image input step of inputting a two-dimensional image;

a first-curve setting step of setting a first curve, which serves as a base line of a canvas, in a three-dimensional space;

an interpolation-curve generating step of generating at least one interpolation curve based on the first curve; and an image generating step of creating the three-dimensional image by pasting the image input in said image input step onto the canvas whose base line is one of the first curve and the interpolation curve as the base line, wherein said image generating step constantly moves the base line of the canvas to which the input image is to be pasted between the first curve and the interpolation curve.

* * * * *